US011994098B2

(12) United States Patent
Ikeda

(10) Patent No.: US 11,994,098 B2
(45) Date of Patent: May 28, 2024

(54) VALVE PLATE, CYLINDER BLOCK, AND HYDRAULIC MOTOR

(71) Applicant: Komatsu Ltd., Tokyo (JP)

(72) Inventor: Mitsutaka Ikeda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 18/018,053

(22) PCT Filed: Sep. 7, 2021

(86) PCT No.: PCT/JP2021/032894
§ 371 (c)(1),
(2) Date: Jan. 26, 2023

(87) PCT Pub. No.: WO2022/054808
PCT Pub. Date: Mar. 17, 2022

(65) Prior Publication Data

US 2023/0279833 A1 Sep. 7, 2023

(30) Foreign Application Priority Data

Sep. 14, 2020 (JP) ................................ 2020-154113

(51) Int. Cl.
*F03C 1/06* (2006.01)
*F01B 3/00* (2006.01)
(Continued)

(52) U.S. Cl.
CPC .......... *F03C 1/0655* (2013.01); *F01B 3/0047* (2013.01); *F01B 3/0055* (2013.01); *F03C 1/0647* (2013.01); *F04B 1/2021* (2013.01)

(58) Field of Classification Search
CPC .... F03C 1/0647; F03C 1/0652; F03C 1/0655; F01B 3/0047; F01B 3/0052; F01B 3/0055;
(Continued)

(56) References Cited

U.S. PATENT DOCUMENTS 2,735,407 A * 2/1956 Born ..................... F03C 1/0655
91/488
3,228,303 A * 1/1966 Budzich ................ F01B 3/0088
91/499
(Continued)

FOREIGN PATENT DOCUMENTS

JP S64-8366 A 1/1989
JP 2003-161268 A 6/2003
JP 2010-116813 A 5/2010

*Primary Examiner* — Michael Leslie
(74) *Attorney, Agent, or Firm* — Locke Lord LLP

(57) ABSTRACT

A valve plate of a hydraulic motor includes first and second pressure ports, and first and second oil grooves, the first and second pressure ports being alternately communicated with a cylinder bore in a cylinder block by bidirectional relative rotation in a state of being in contact with an end face of the cylinder block. Further, pad oil grooves communicating with the first oil groove and opened toward the end face of the cylinder block are provided in outer peripheral portions of the first and second pressure ports in a pad region, and the plurality of pad oil grooves is provided such that a proportion of an opening area to the end face of the cylinder block is larger at two end portions close to the second oil grooves than at a central portion separated from the second oil grooves in a circumferential direction of relative rotation.

18 Claims, 22 Drawing Sheets

(51) Int. Cl.
*F03C 1/34* (2006.01)
*F04B 1/2021* (2020.01)

(58) Field of Classification Search
CPC .... F04B 1/2021; F04B 1/2035; F04B 1/2042; F04B 27/0826; F04B 27/0834; F04B 27/0839
See application file for complete search history.

(56) References Cited

U.S. PATENT DOCUMENTS

| | | | | | |
|---|---|---|---|---|---|
| 3,657,970 | A * | 4/1972 | Kobayashi | F01B 3/0047 | 91/487 |
| 3,890,883 | A * | 6/1975 | Rometsch | F04B 1/2021 | 91/499 |
| 5,205,124 | A * | 4/1993 | Budzich | F03C 1/0655 | 91/485 |
| 9,175,672 | B2 * | 11/2015 | Ohno | F01B 3/0047 | |
| 2023/0304481 | A1 * | 9/2023 | Ikeda | F04B 1/2042 | |

* cited by examiner

VALVE PLATE, CYLINDER BLOCK, AND HYDRAULIC MOTOR

FIELD

The invention disclosure relates to a valve plate, a cylinder block, and a hydraulic motor.

Some hydraulic motors of this type include an annular oil groove and a plurality of radial oil grooves provided between a valve plate and an end face of the cylinder block. The annular oil groove is a cavity configured in an endless annular shape at an outer peripheral portion with respect to two pressure ports provided in the valve plate. The radial oil groove extends from the annular oil groove along the radial direction to the outer periphery, and is provided at a plurality of places at equal intervals. In this hydraulic motor, oil between the valve plate and the end face of the cylinder block is discharged into the case via the annular oil groove and the radial oil grooves. For this reason, there is a concern that it is difficult to maintain an oil film between the valve plate and the end face of the cylinder block in a region (hereinafter, referred to as a pad region) that is an outer periphery with respect to the annular oil groove. In order to solve such a problem, in the related art, there are also provided those in which an oil reservoir is formed in an outer peripheral portion with respect to an annular oil groove to lubricate a pad region (see, for example, Patent Literature 1).

CITATION LIST

Patent Literature

Patent Literature 1: Japanese Lai-open Patent Publication No. 2010-116813

SUMMARY

Technical Problem

Meanwhile, recent hydraulic motors have been demanded to increase the pressure and speed. In a hydraulic motor with high pressure and high speed, it is difficult to maintain an oil film in a pad region even when the above-described oil reservoir is provided, and there is a possibility that problems such as seizure and galling occur between the valve plate and the end face of the cylinder block.

In view of the above circumstances, an object of the present disclosure is to provide a valve plate, a cylinder block, and a hydraulic motor capable of preventing problems such as seizure and galling from occurring between the valve plate and the end face of the cylinder block even under high pressure and high speed conditions.

To attain the above object, a valve plate of a hydraulic motor according to the present disclosure includes a first pressure port and a second pressure port on a circumference about a rotation axis, a first oil groove provided to be endless in an outer peripheral part with respect to the first pressure port and the second pressure port, and a plurality of second oil grooves extending from the first oil groove toward an outer periphery, the first pressure port and the second pressure port being alternately communicated with a cylinder bore provided in a cylinder block by bidirectional relative rotation about the rotation axis in a state of being in contact with an end face of the cylinder block. Further, a plurality of pad oil grooves communicating with the first oil groove and opened toward the end face of the cylinder block is provided in outer peripheral portions of the first pressure port and the second pressure port in a pad region contacting the end face of the cylinder block between the second oil grooves, and the plurality of pad oil grooves is provided such that a proportion of an opening area to the end face of the cylinder block is larger at two end portions close to the second oil grooves than at a central portion separated from the second oil grooves in a circumferential direction of relative rotation.

Advantageous Effects of Invention

According to the present disclosure, since the oil in a first oil groove is supplied to the pad region through a pad oil groove, the oil film is secured between the valve plate and the end face of the cylinder block even when the pressure and speed are increased, and it is possible to prevent problems such as seizure and galling from occurring. Moreover, the pad oil groove is provided such that the proportion of an opening area to the end face of the cylinder block is larger at two end portions close to a second oil groove than at a central portion separated from the second oil groove in the circumferential direction of relative rotation. In other words, a sliding portion with the cylinder block is secured in the central portion of the pad region. Therefore, there is no concern that the rotation of the cylinder block becomes unstable due to the provision of the pad oil groove, and high pressure and high speed can be realized.

DESCRIPTION OF EMBODIMENTS

Hereinafter, preferred embodiments of a valve plate, a cylinder block, and a hydraulic motor according to the present disclosure will be described in detail with reference to the accompanying drawings.

First Embodiment

Figure 1A:
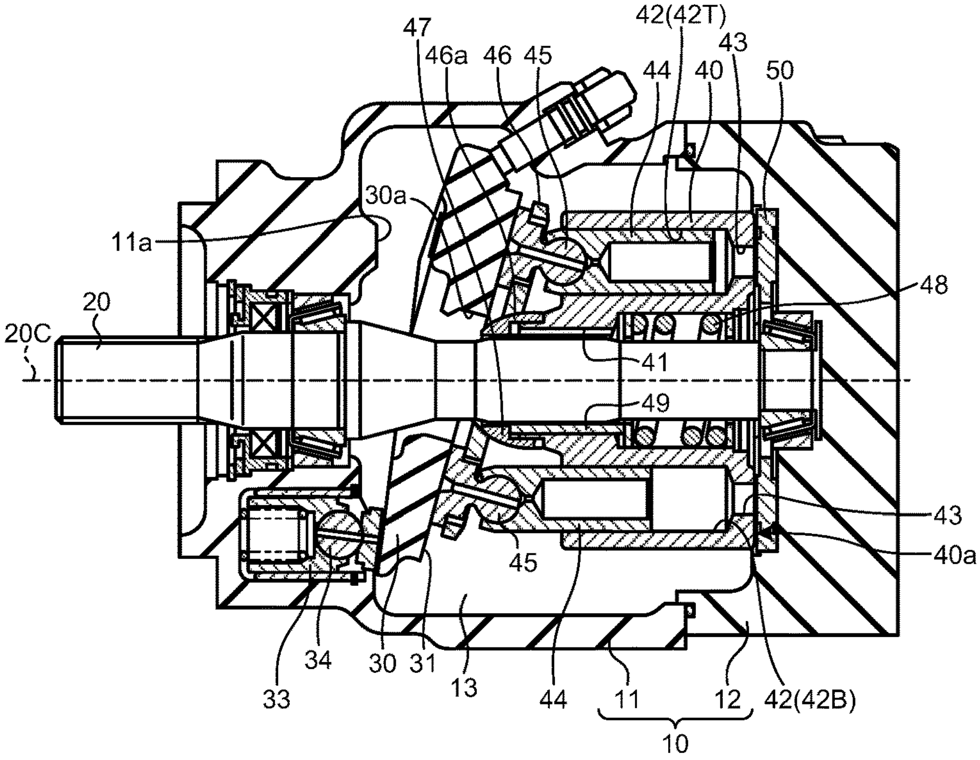
FIG. 1A illustrates a hydraulic motor of a first embodiment of the present disclosure, and is a cross-sectional diagram cut along a plane including a rotation axis.
Figure 1B:
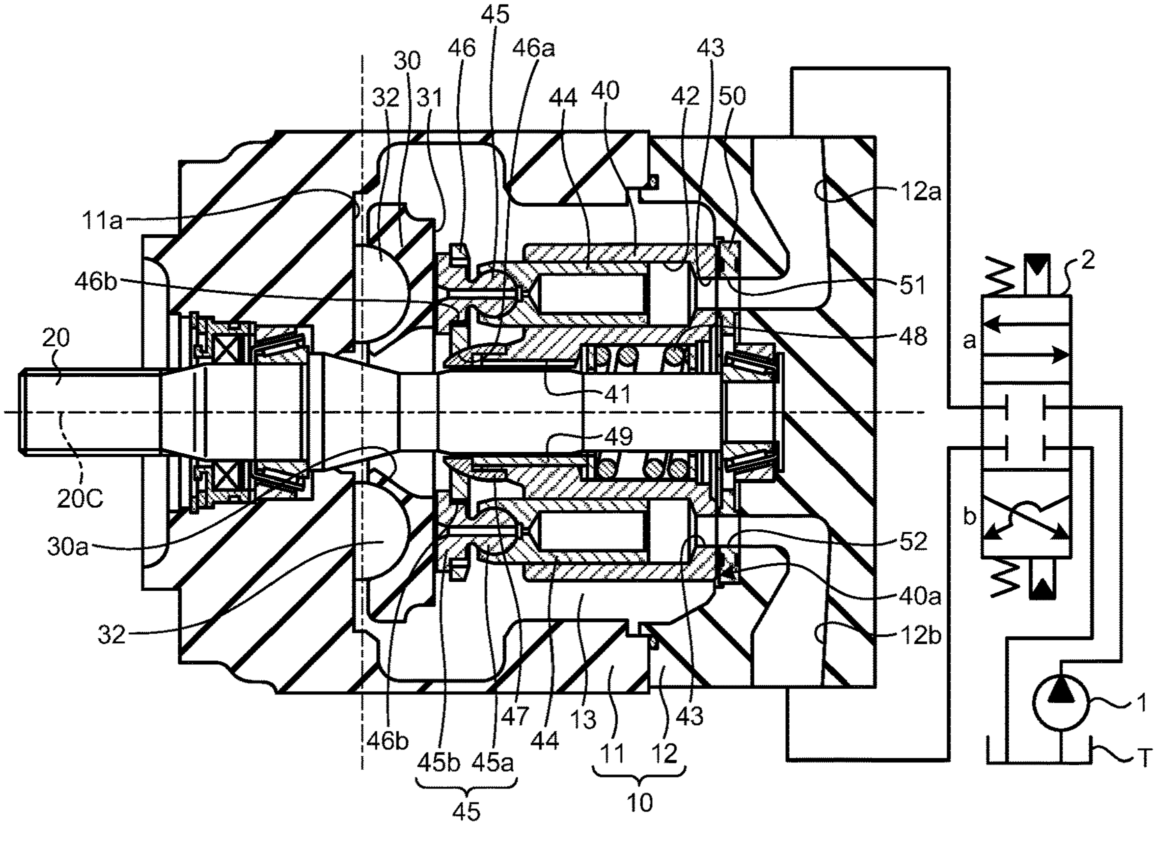
FIG. 1B illustrates a hydraulic motor of the first embodiment of the present disclosure, and is a cross-sectional diagram cut along a plane including a rotation axis and orthogonal to the cutting plane of FIG. 1A.

FIGS. 1A and 1B illustrate a hydraulic motor of a first embodiment of the present disclosure. Although not illustrated in the drawings, the hydraulic motor exemplified here is of an axial type that is bidirectionally rotationally driven suitable as a traveling motor that causes a work machine such as an excavator to travel. That is, in the hydraulic motor of the first embodiment, a switching valve 2 is provided with respect to a hydraulic pump 1 serving as an oil supply source, and it is possible to change the rotation direction of an output shaft 20 with respect to a case 10 described below by switching the oil supply direction.

The case 10 includes a case body 11 and a port block 12, and constitutes a housing chamber 13 therebetween. The output shaft 20 is a columnar member disposed so as to cross the housing chamber 13 of the case 10, and has one end rotatably supported by the case body 11 and the other end rotatably supported by the port block 12. The one end of the output shaft 20 protrudes to the outside of the case body 11 as an output end of the hydraulic motor, and is coupled to, for example, a traveling drive system of the work machine. The other end of the output shaft 20 terminates inside the port block 12. The output shaft 20 is provided with a swash plate 30 and a cylinder block 40 on the outer periphery of a portion housed in the housing chamber 13.

The swash plate 30 is a plate-shaped member having a flat sliding surface 31 on a side facing the port block 12, and is disposed at a position close to an inner wall surface 11*a* of the case body 11 in a state where the output shaft 20 penetrates an opening 30*a* provided at a central part. The swash plate 30 is supported on the inner wall surface 11*a* of the case body 11 via two ball retainers 32 having a substantially hemispherical shape, and can tilt the sliding surface 31 with respect to the output shaft 20. Reference numeral 33 in the drawings denotes a servo device provided on the case body 11. The servo device 33 is a hydraulic cylinder that is movable along an axis (hereinafter, referred to as a rotation axis 20C) of the output shaft 20 and contacts the swash plate 30 via a tilting member 34. When the servo device 33 is extended and contracted by hydraulic pressure such as pilot pressure or supply pressure from the hydraulic pump 1, the swash plate 30 moves along the spherical surface of the ball retainers 32, and the inclination angle of the swash plate with respect to the rotation axis 20C of the output shaft 20 can be changed.

The cylinder block 40 is a cylindrical member having a center hole 41, and is disposed between the port block 12 and the swash plate 30 in a state where the output shaft 20 penetrates the center hole 41. A spline is provided between the center hole 41 of the cylinder block 40 and the outer peripheral surface of the output shaft 20 so that the cylinder block 40 rotates integrally with the output shaft 20. That is, the cylinder block 40 can rotate bidirectionally about the output shaft 20 with respect to the case 10.

Figure 2A:
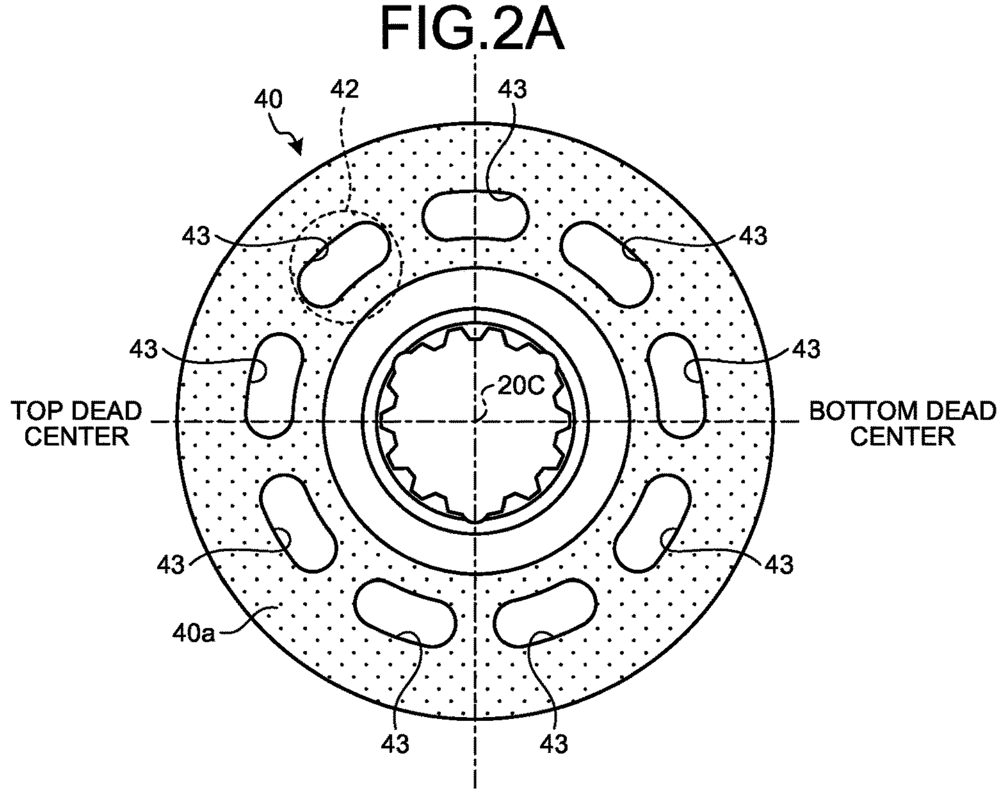
FIG. 2A illustrates components of the hydraulic motor illustrated in FIGS. 1A and 1B, and is an end face diagram illustrating a contact surface of a cylinder block with a valve plate.

In the cylinder block 40, a plurality of cylinder bores 42 is formed on the circumference about the rotation axis 20C of the output shaft 20. The cylinder bores 42 are cylindrical cavities formed so as to be parallel to the rotation axis 20C of the output shaft 20, and are arranged at equal intervals along the circumferential direction. As illustrated in FIG. 2A, in the present first embodiment, nine cylinder bores 42 are provided in the cylinder block 40. Each of the cylinder bores 42 opens to an end face facing the swash plate 30, while an end close to the port block 12 terminates inside the cylinder block 40 and opens to an end face 40*a* of the cylinder block 40 via a communication port 43 having a reduced cross-sectional area.

As illustrated in FIGS. 1A and 1B, a piston 44 is disposed in each of the cylinder bores 42 of the cylinder block 40. The piston 44 has a columnar shape with a circular cross section, and is fitted in the cylinder bore 42 in a state of being movable along the axis. A piston shoe 45 is provided at an end of each piston 44 facing the swash plate 30. The piston shoe 45 is configured to be tiltable with respect to the piston 44 and slidable with respect to the sliding surface 31 of the swash plate 30. In the present first embodiment, an example in which the piston shoe 45 has a spherical portion 45*a* and a sliding portion 45*b*, and is tiltably supported at a tip portion of each piston 44 via the spherical portion 45*a* is illustrated.

As a configuration for tiltably supporting the piston shoe 45 with respect to the piston 44, the spherical portion may be provided at an end of the piston 44.

Each of the piston shoes 45 is pressed against the sliding surface 31 of the swash plate 30 via a pressing plate 46. The pressing plate 46 is a flat plate-shaped member having substantially the same outer diameter as the cylinder block 40, has a pressing hole 46*a* at the center portion, and has a mounting hole 46*b* at a portion corresponding to each piston 44. The mounting hole 46*b* is an opening having an inner diameter through which the spherical portion 45*a* of the piston shoe 45 can be inserted and the sliding portion 45*b* cannot be inserted. The pressing plate 46 is disposed between the cylinder block 40 and the swash plate 30 in a state where the output shaft 20 penetrates the pressing hole 46*a* and the piston shoes 45 are inserted into the respective mounting holes 46*b*.

The pressing hole 46*a* formed in the pressing plate 46 has an inner peripheral surface having a spherical shape, and includes a retainer guide 47 therein. The retainer guide 47 is formed in a hemispherical shape having an outer diameter fitted into the pressing hole 46*a* of the pressing plate 46, and is disposed between the pressing plate 46 and the cylinder block 40 in a state where the output shaft 20 penetrates the center portion thereof and the spherical part contacts the pressing hole 46*a* of the pressing plate 46. The retainer guide 47 and the outer peripheral surface of the output shaft 20 are joined by a spline such that the retainer guide 47 rotates integrally with the output shaft 20 and is movable along the rotation axis 20C of the output shaft 20. A pressing force of a pressing spring 48 incorporated in the center portion of the cylinder block 40 is constantly applied to the retainer guide 47 via a transmission rod 49. The pressing force of the pressing spring 48 applied to the retainer guide 47 is applied to the piston shoe 45 via the pressing plate 46, and acts to constantly bring each of the sliding portions 45*b* of the piston shoes 45 into contact with the sliding surface 31 of the swash plate 30.

Figure 2B:
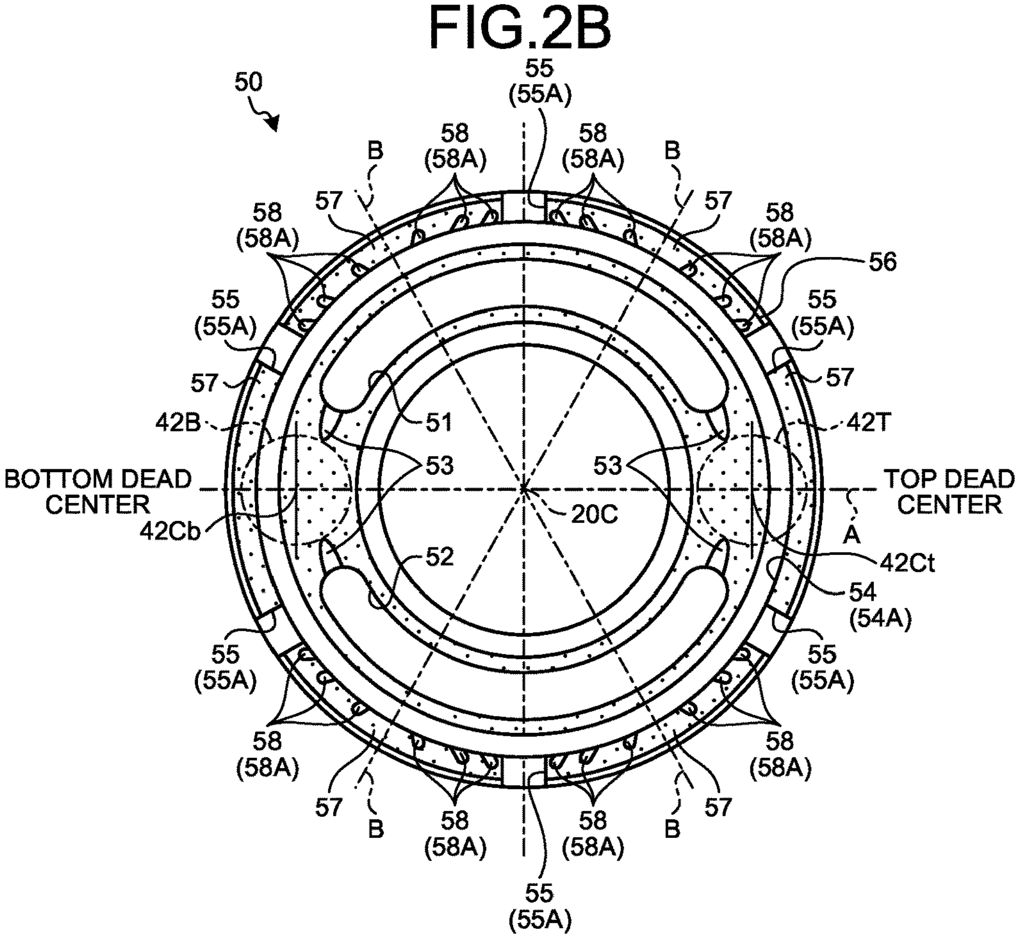
FIG. 2B illustrates components of the hydraulic motor illustrated in FIGS. 1A and 1B, and is an end face diagram illustrating a contact surface of a valve plate with a cylinder block.

On the other hand, in the port block 12, a valve plate 50 is provided at a portion facing the communication ports 43 of the cylinder block 40. As illustrated in FIG. 2B, the valve plate 50 is a circular plate-shaped member having a first pressure port 51 and a second pressure port 52, and slidably contacts the end face 40*a* of the cylinder block 40 in a state where the communication ports 43 of the cylinder block 40 can alternately communicate with the first pressure port 51 and the second pressure port 52. That is, the first pressure port 51 and the second pressure port 52 are through-holes provided on the same circumference about on the rotation axis 20C of the output shaft 20, and each have an arc shape. In the above-described example, the first pressure port 51 and the second pressure port 52 are formed so as to be symmetric with each other with respect to a virtual plane A including an axis 42Ct of a cylinder bore 42T in which the piston 44 is located at the top dead center and an axis 42Cb of a cylinder bore 42B in which the piston 44 is located at the bottom dead center in the valve plate 50. The first pressure port 51 and the second pressure port 52 are set in length and position in the circumferential direction so as not to communicate with both the communication port 43 of the cylinder bore 42T in which the piston 44 is located at the top dead center and the communication port 43 of the cylinder bore 42B in which the piston 44 is located at the bottom dead center.

As illustrated in FIG. 1B, the first pressure port 51 and the second pressure port 52 communicate with respective supply and discharge passages 12*a* and 12*b* formed in the port block 12, and furthermore the hydraulic pump 1 is connected via the switching valve 2. Reference numeral 53 in FIG. 2B denotes a notch provided in each pressure port. These notches 53 are opened only on the contact surface of the valve plate 50 with the cylinder block 40. Note that, in the drawings, for the sake of convenience, a dot is provided at each contact part between the cylinder block 40 and the valve plate 50.

Further, the valve plate 50 is provided with an annular oil groove (first oil groove) 54 and a plurality of radial oil grooves (second oil grooves) 55. The annular oil groove 54 is an endless annular recess provided in an outer peripheral portion with respect to the first pressure port 51 and the second pressure port 52. The annular oil groove 54 has, for example, a substantially semicircular cross section with a constant radius, and is open only on a surface facing the end face 40*a* of the cylinder block 40. The radial oil grooves 55 are linear recesses extending from the annular oil groove 54 toward the outer periphery, and are formed at equal interval positions along the circumferential direction. The radial oil grooves 55 have, for example, a substantially semicircular cross section with a constant radius, are open on a surface facing the end face 40*a* of the cylinder block 40, and have outer peripheral side ends open on the outer peripheral surface of the valve plate 50. In the present first embodiment, the six radial oil grooves 55 are formed radially along a radial r direction about the rotation axis 20C in outer peripheral side portions with respect to the annular oil groove 54. In particular, in the illustrated example, three radial oil grooves 55 are provided to be symmetric with each other in each of two regions obtained by dividing into two equal parts relative to the virtual plane A described above. The outermost peripheral portions of the radial oil grooves 55 communicate with each other by an outermost peripheral groove 56 extending in the circumferential direction.

Figure 3A:
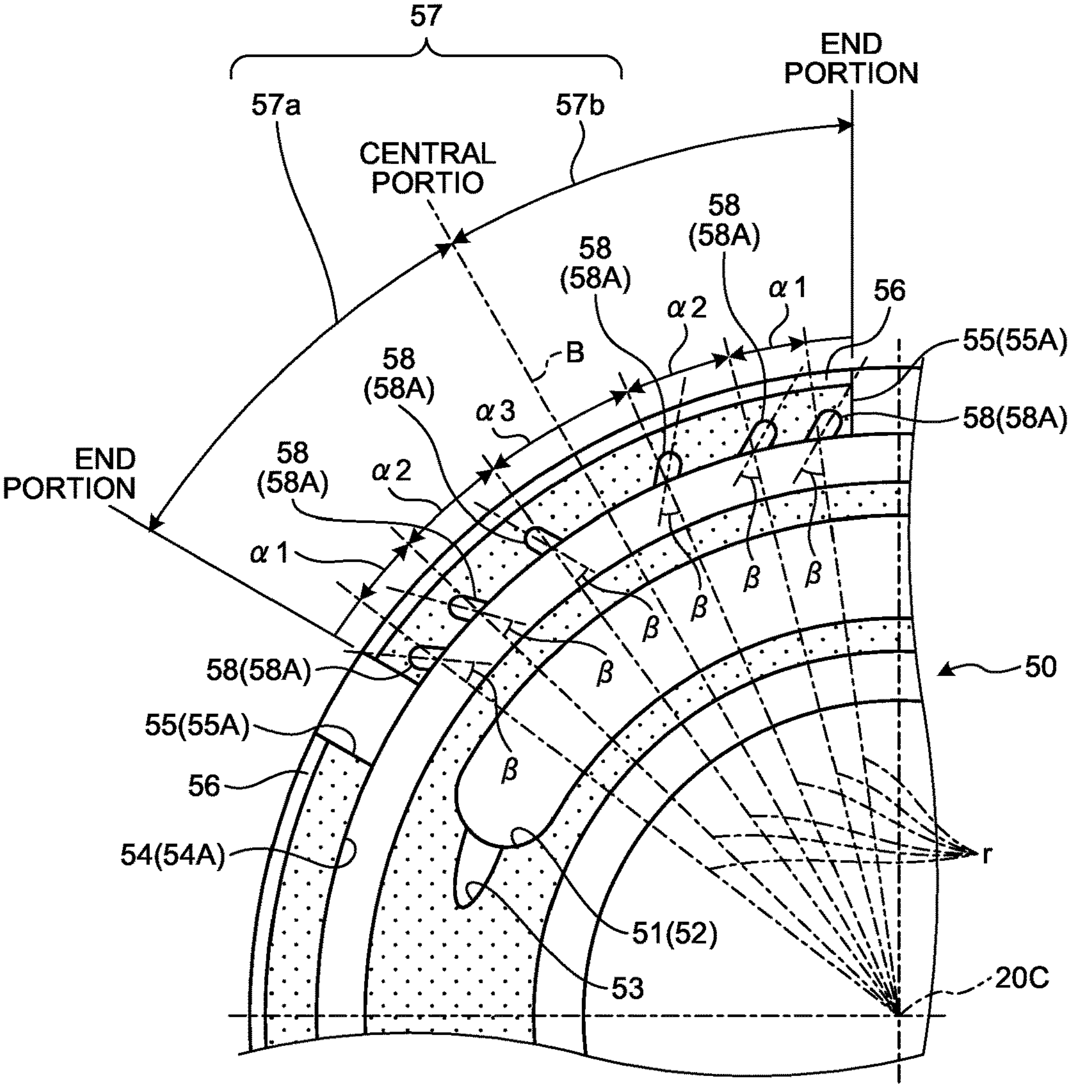
FIG. 3A is an enlarged diagram of a main part of the valve plate illustrated in FIG. 2B, and is an enlarged diagram of a portion of approximately ¼.
Figure 3B:
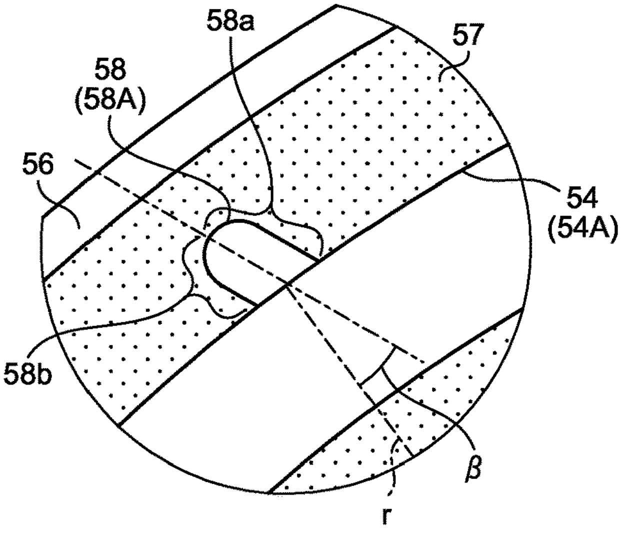
FIG. 3B is an enlarged diagram of a main part of the valve plate illustrated in FIG. 2B, and is an enlarged diagram of a pad region and a pad oil groove.

Furthermore, in the valve plate 50, as illustrated in FIGS. 2B, 3A, and 3B, pad oil grooves 58 are provided in a pad region 57 formed between the radial oil grooves 55 in an outer peripheral portion with respect to the annular oil groove 54. The pad oil grooves 58 are linear recesses having one end communicating with the annular oil groove 54 and the other end closed. In the illustrated example, a plurality of pad oil grooves 58 is formed in each of two pad regions 57 located on the outer periphery of the first pressure port 51 and two pad regions 57 located on the outer periphery of the second pressure port 52 so as to be in the same arrangement state. The pad oil grooves 58 have, for example, a substantially semicircular cross section with a constant radius, and are open on a surface facing the end face 40*a* of the cylinder block 40. The width of the pad oil groove 58 is smaller than that of the radial oil groove 55. The length of the pad oil groove 58 is provided between the annular oil groove 54 and a portion that is approximately ½ of the dimension along the radial direction of the pad region 57. As is apparent from the drawings, the plurality of pad oil grooves 58 is provided at unequal pitches such that a mutual interval gradually increases from end portions close to the radial oil grooves 55 on both sides toward a central portion in the circumferential direction of relative rotation with the cylinder block 40 about the rotation axis 20C. In particular, in the first embodiment, the pad oil grooves 58 provided in each of half region portions 57*a* and 57*b* are configured to be symmetric with each other relative to a virtual plane B that divides the pad region 57 into two equal parts in the circumferential direction of the relative rotation. Specifically, the pad oil grooves 58 are arranged at positions of $\alpha 1$=about 6.4° and $\alpha 2$=about 9.5° from the pad oil grooves 58 at the end portions closest to the radial oil grooves 55 toward the central portion in the circumferential direction of the relative rotation. In each of the half region portions 57$a$ and 57$b$ having the virtual plane B as a boundary, the pad oil grooves 58 located in the central portion farthest away from the radial oil grooves 55 have $\alpha 3$=about 12.8° therebetween. Thus, the proportion of the opening area of the pad oil groove 58 to the end face 40$a$ of the cylinder block 40 is larger at two end portions close to the respective radial oil grooves 55 than at the central portion separated from the two radial oil grooves 55 on both sides in the pad region 57.

Furthermore, each of the pad oil grooves 58 is inclined with respect to the radial r direction about the rotation axis 20C. In the illustrated example, the pad oil grooves 58 are provided to be inclined so as to be opposite to each other in the half region portions 57$a$ and 57$b$ having the virtual plane B as a boundary. Inclination angles β of the pad oil grooves 58 are the same as each other, and are set to about 30° with respect to the radial r direction about the rotation axis 20C. The inclination direction of the pad oil grooves 58 is a direction gradually approaching the radial oil groove 55 toward the outer periphery in each of the half region portions 57$a$ and 57$b$. As is clear from FIG. 3B, in the pad oil groove 58 inclined with respect to the radial r direction, the length of a side 58$a$, which is an outer peripheral side of the rotation, is larger than the length of a side 58$b$, which is an inner peripheral side close to the annular oil groove 54.

In the hydraulic motor configured as described above, for example, by operating the switching valve 2 from a neutral position to a position a in FIG. 1B, the hydraulic pump 1 is connected to the upper supply and discharge passage 12$a$, and the lower supply and discharge passage 12$b$ is connected to an oil tank T. When the hydraulic pump 1 is driven from this state, oil is supplied to the first pressure port 51 arranged above in FIG. 2B, and furthermore oil is supplied to the cylinder bores 42 via the communication ports 43. Thus, the pistons 44 arranged at the top dead center sequentially move toward the bottom dead center, and the cylinder block 40 rotates counterclockwise about the rotation axis 20C in FIG. 2B. In other words, in a case where the valve plate 50 is viewed from one end side of the output shaft 20, when the switching valve 2 is operated to the position a, the cylinder block 40 rotates counterclockwise about the rotation axis 20C. Accordingly, since the output shaft 20 also rotates in the same direction, for example, the work machine travels forward. Note that, meanwhile, in the lower supply and discharge passage 12$b$ connected to the second pressure port 52, the pistons 44 move from the bottom dead center to the top dead center, whereby the oil supplied to the cylinder bores 42 is discharged and discharged to the oil tank T via the switching valve 2.

On the other hand, it is operated from the neutral position to a position b in FIG. 1B, the hydraulic pump 1 is connected to the lower supply and discharge passage 12$b$, and the upper supply and discharge passage 12$a$ is connected to the oil tank T. When the hydraulic pump 1 is driven from this state, oil is supplied to the second pressure port 52 arranged below in FIG. 2B, and furthermore oil is supplied to the cylinder bores 42 via the communication ports 43. Thus, the pistons 44 arranged at the top dead center sequentially move toward the bottom dead center, and the cylinder block 40 rotates clockwise about the rotation axis 20C in FIG. 2B. In other words, in a case where the valve plate 50 is viewed from one end side of the output shaft 20, when the switching valve 2 is operated to the position b, the cylinder block 40 rotates clockwise about the rotation axis 20C. Accordingly, since the output shaft 20 also rotates in the same direction, for example, the work machine travels rearward.

During the operation described above, when the hydraulic pressure such as the pilot pressure or the supply pressure from the hydraulic pump 1 is supplied to the servo device 33 and the inclination angle of the swash plate 30 is changed accordingly, the process distance of the piston 44 changes. For this reason, the rotation rate of the cylinder block 40 changes, and the forward speed and the backward speed of the work machine can be changed.

As illustrated in FIGS. 1A, 1B, 2B, 3A, and 3B, between the cylinder block 40 and the valve plate 50, the end face 40$a$ of the cylinder block 40 contacts the valve plate 50, whereby the annular oil groove 54 constitutes an endless annular oil passage 54A with respect to the cylinder block 40. Further, between the cylinder block 40 and the valve plate 50, a plurality of radial oil passages 55A opened from the endless annular oil passage 54A to the housing chamber 13 is formed by the radial oil grooves 55. Therefore, while the end face 40$a$ of the cylinder block 40 and the valve plate 50 are relatively sliding, the oil leaking from the pressure ports 51 and 52 lubricates between the cylinder block 40 and the valve plate 50. The oil after lubrication between the cylinder block 40 and the valve plate 50 is discharged to the housing chamber 13 of the case 10 via the endless annular oil passage 54A and the radial oil passages 55A. Further, a part of the oil passing through the radial oil passages 55A reaches the pad region 57 as a result of the rotation of the cylinder block 40 and lubricates between the cylinder block 40 and the valve plate 50. Therefore, a sufficient oil film can be secured even when the pressure and speed are increased in an inner peripheral side portion with respect to the endless annular oil passage 54A and an end portion close to the radial oil passage 55A on the upstream side of the relative rotation in the pad region 57. Thus, there is no possibility that problems such as seizure and galling caused by oil shortage occur.

On the other hand, the oil from the radial oil passages 55A hardly reaches an end portion on the downstream side of the relative rotation in the pad region 57. For this reason, in particular, in the outer peripheral portions of the pressure ports 51 and 52 on the high pressure side, there is a concern that it is difficult to sufficiently secure the oil film only by the oil passing through the radial oil passages 55A.

FIGS. 4A to 4D illustrate changes in the pressure state generated in the first pressure port 51 and the second pressure port 52 while the oil is supplied from the hydraulic pump 1. Now, as indicated by an arrow D in FIGS. 4A and 4B, it is assumed that when the valve plate 50 is viewed from one end side of the output shaft 20, the output shaft 20 (cylinder block 40) rotates to the left and the work machine moves forward. When the work machine moves forward in constant-speed traveling or acceleration traveling, as indicated by hatching in FIG. 4A, the first pressure port 51 connected to the hydraulic pump 1 (see FIG. 1B) is on the high pressure side. Therefore, in this state, there is a concern that oil shortage occurs in a left end portion (region E in FIG. 4A) in the circumferential direction on the downstream side of the relative rotation in the pad region 57 located on the outer periphery of the first pressure port 51. On the other hand, also when the output shaft 20 (cylinder block 40) rotates to the left and moves forward, the second pressure port 52 connected to the oil tank T (see FIG. 1B) is on the high pressure side as indicated by hatching in FIG. 4B during deceleration traveling. Therefore, in this state, there is a concern that oil shortage occurs in a right end portion (region E in FIG. 4B) in the circumferential direction on the downstream side of the relative rotation in the pad region 57 located on the outer periphery of the second pressure port 52.

Figure 4A:
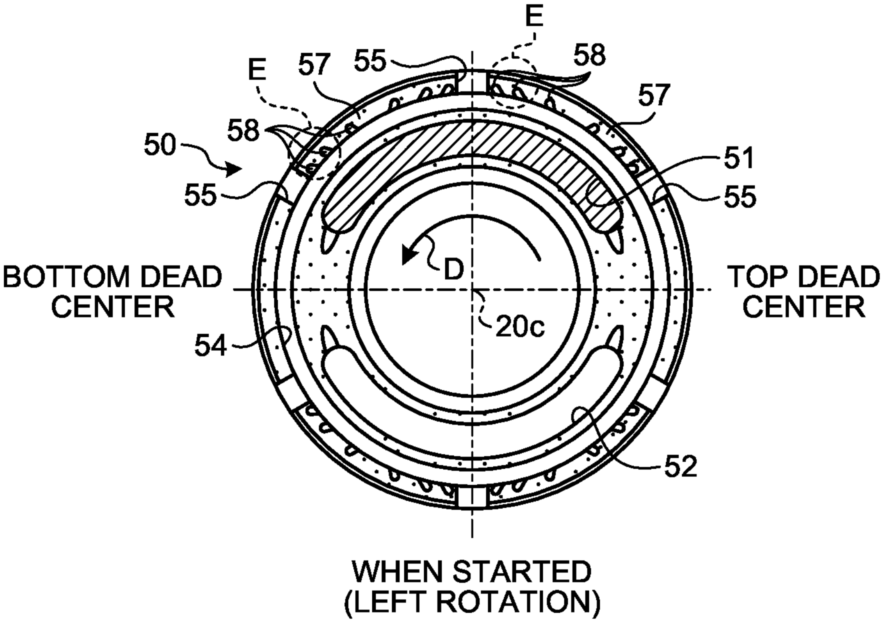
FIG. 4A illustrates a pressure state of two pressure ports in the valve plate illustrated in FIG. 2B and a lubrication-requiring portion of the pad region at that time, and is an end face diagram when the cylinder block starts rotating to the left.
Figure 4B:
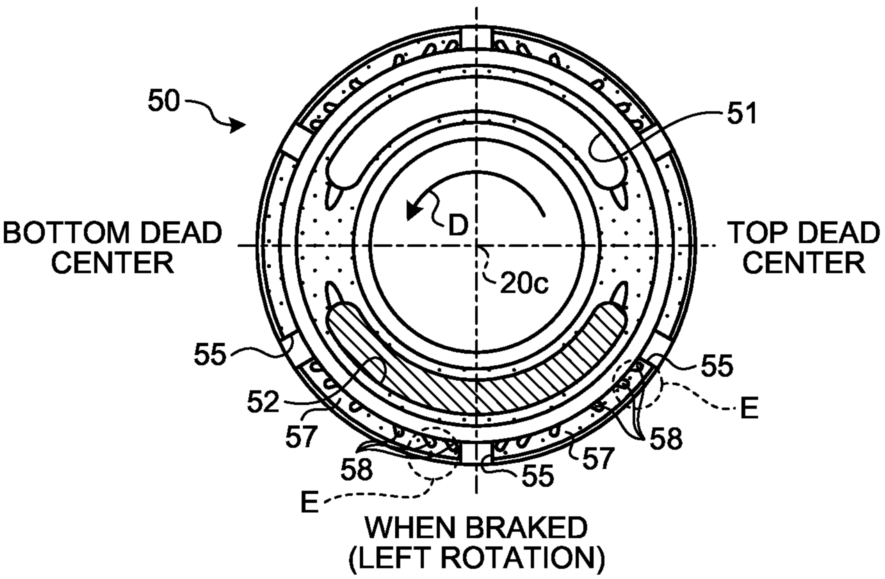
FIG. 4B illustrates a pressure state of two pressure ports in the valve plate illustrated in FIG. 2B and a lubrication-requiring portion of the pad region at that time, and is an end face diagram when the cylinder block is braked during left rotation.
Figure 4C:
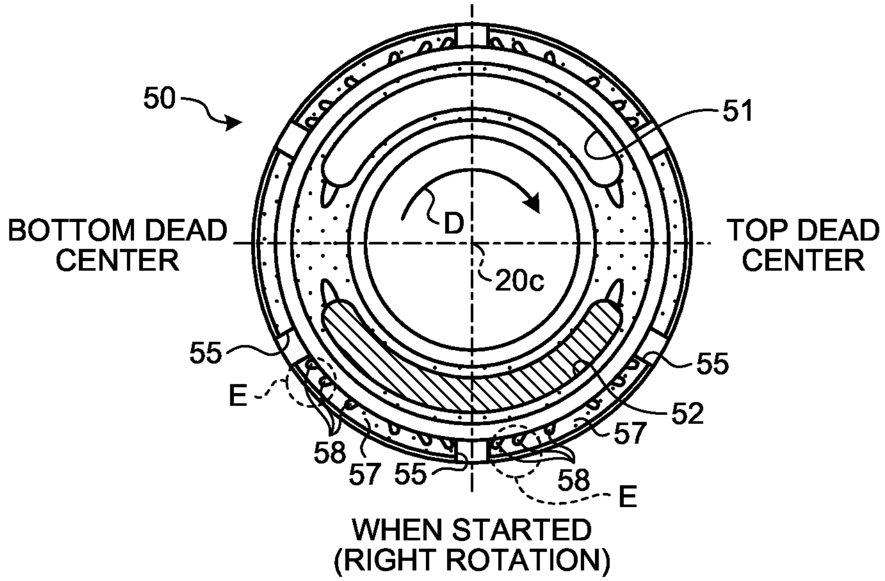
FIG. 4C illustrates a pressure state of two pressure ports in the valve plate illustrated in FIG. 2B and a lubrication-requiring portion of the pad region at that time, and is an end face diagram when the cylinder block starts rotating to the right.
Figure 4D:
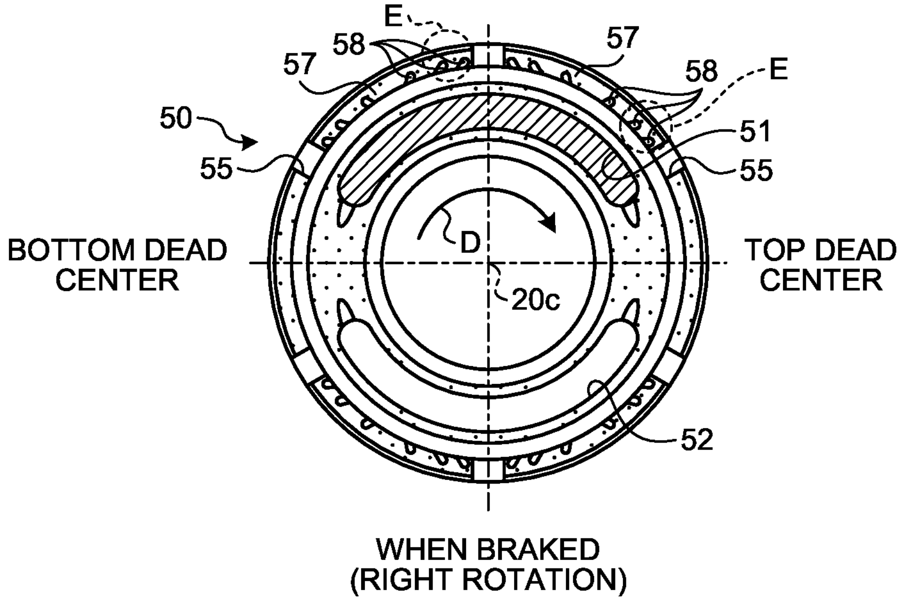
FIG. 4D illustrates a pressure state of two pressure ports in the valve plate illustrated in FIG. 2B and a lubrication-requiring portion of the pad region at that time, and is an end face diagram when the cylinder block is braked during right rotation.

On the other hand, as indicated by an arrow D in FIGS. 4C and 4D, it is assumed that when the valve plate 50 is viewed from one end side of the output shaft 20, the output shaft 20 (cylinder block 40) rotates to the right and the work machine moves rearward. When the work machine moves rearward in constant-speed traveling or acceleration traveling, as indicated by hatching in FIG. 4C, the second pressure port 52 connected to the hydraulic pump 1 (see FIG. 1B) is on the high pressure side. Therefore, in this state, there is a concern that oil shortage occurs in a left end portion (region E in FIG. 4C) in the circumferential direction on the downstream side of the relative rotation in the pad region 57 located on the outer periphery of the second pressure port 52. On the other hand, also when the output shaft 20 (cylinder block 40) rotates to the right and moves rearward, the first pressure port 51 connected to the oil tank T (see FIG. 1B) is on the high pressure side as indicated by hatching in FIG. 4D during deceleration traveling. Therefore, in this state, there is a concern that oil shortage occurs in a right end portion (region E in FIG. 4D) in the circumferential direction on the downstream side of the relative rotation in the pad region 57 located on the outer periphery of the first pressure port 51.

However, in the hydraulic motor described above, the pad oil grooves 58 are provided at both end portions close to the radial oil grooves 55 in the circumferential direction of the relative rotation with respect to the pad region 57 located on the outer periphery of the first pressure port 51 and the pad region 57 located on the outer periphery of the second pressure port 52. When the cylinder block 40 contacts the valve plate 50, the pad oil grooves 58 constitute pad oil passages 58A that communicate the endless annular oil passage 54A with the end portions of the pad region 57. Thus, the oil in the endless annular oil passage 54A is supplied to the end portions of the pad region 57 through the pad oil passages 58A. Therefore, even when the hydraulic motor is increased in pressure and speed, there is no possibility of causing oil shortage in the portion where the end face 40*a* of the cylinder block 40 and the valve plate 50 relatively slide, and there is no concern that problems such as seizure and galling occur. That is, since the pad oil grooves 58 are formed in advance in the end portions where oil shortage is concerned in all the rotation states illustrated in FIGS. 4A to 4D, it is possible to prevent the problems caused by the oil shortage in advance. Moreover, regarding the pad region 57 on which the outer peripheral portion of the cylinder block 40 contacts, the pad oil grooves 58 are formed only on the outer peripheral portions of the pressure ports 51 and 52, and the pad oil grooves 58 are not provided in the pad region 57 not located on the outer peripheral portions of the pressure ports 51 and 52 located on the left and right in FIGS. 4A to 4D. Furthermore, also in the pad region 57 provided with the pad oil grooves 58, the pad oil grooves 58 are provided such that the proportion of the opening area to the end face 40*a* of the cylinder block 40 is larger at the end portions than at the central portion. For this reason, a contact part with the cylinder block 40 can be secured in the pad region 57 other than the outer peripheral portions of the pressure ports 51 and 52 and the central portion of the pad region 57 located on the outer peripheries of the pressure ports 51 and 52. As a result, there is no concern that the rotation of the cylinder block 40 becomes unstable due to the provision of the pad oil grooves 58, and high pressure and high speed of the hydraulic motor can be realized.

Note that, in the first embodiment described above, the example in which the inclination angle of the swash plate 30 can be changed is illustrated, but it is not always necessary to be capable of changing the inclination angle of the swash plate 30. Further, although the cylinder block 40 is provided with nine cylinder bores 42 as an example, the number of cylinder bores 42 is not limited thereto. Furthermore, an example in which six radial oil grooves 55 are linearly provided is illustrated, but the shape and number of radial oil grooves 55 are not limited to those of the first embodiment.

Figure 11:
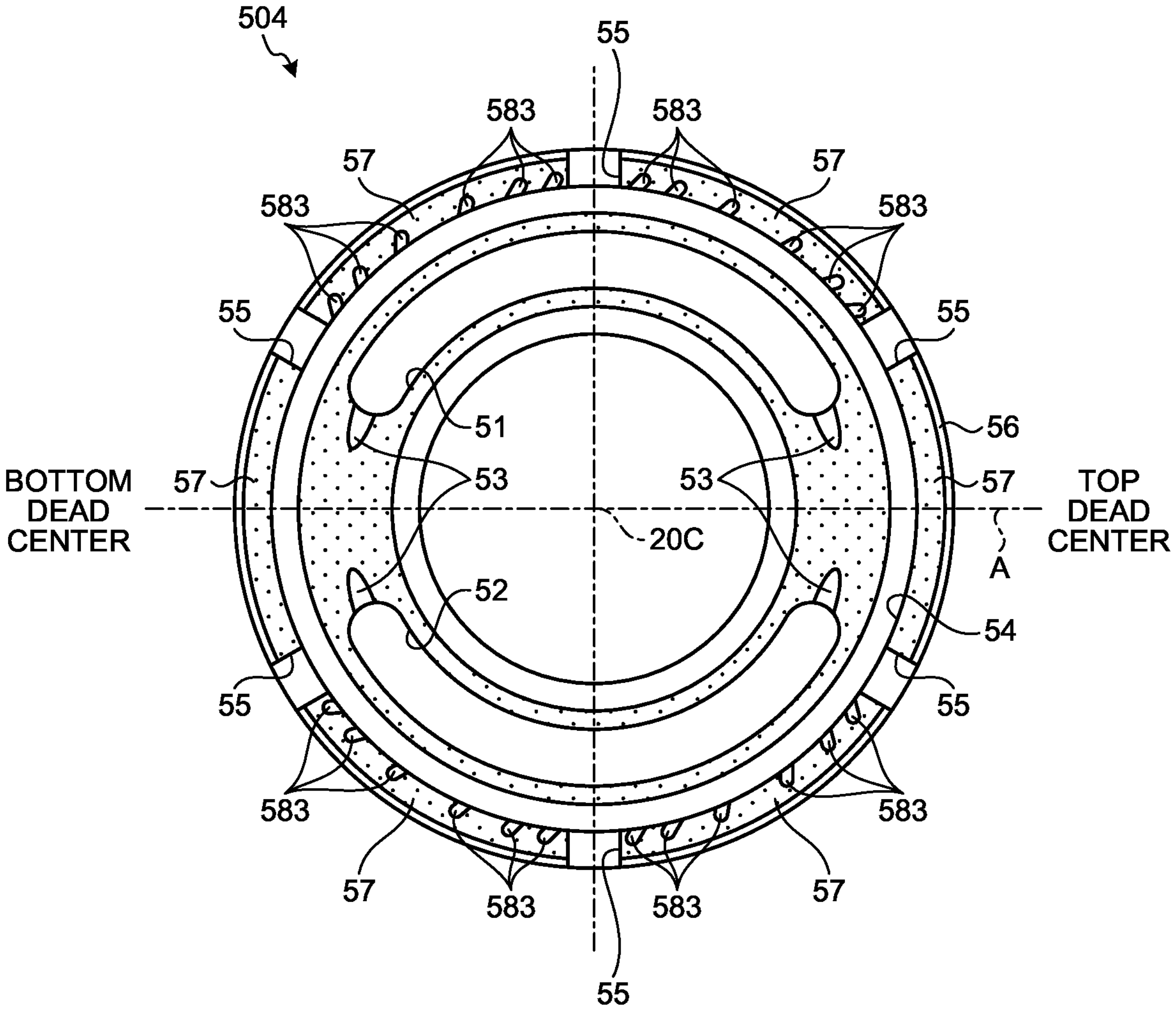
FIG. 11 is an end face diagram of a valve plate of a fourth modification.
Figure 12:
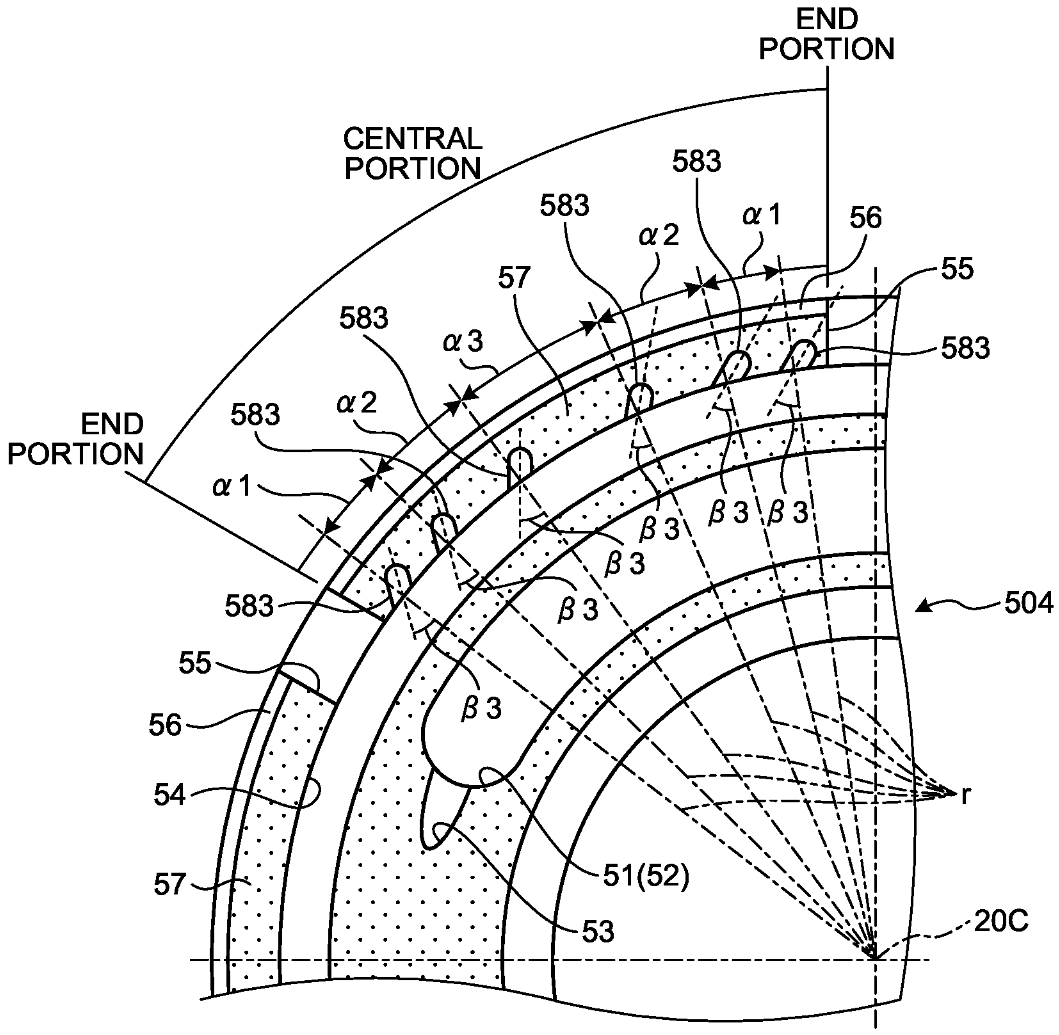
FIG. 12 is an enlarged diagram of a main part of the valve plate illustrated in FIG. 11.

Further, in the first embodiment described above, the pad oil grooves 58 are inclined with respect to the radial r direction about the rotation axis 20C, and the sides located on the downstream side in the pad oil grooves 58 are located on the inner peripheral side at the end portions on the downstream side of the relative rotation. Therefore, even under a situation where the cylinder block 40 rotates at a relatively high speed exceeding 2300 rpm, the oil supplied to the pad region 57 from the side on the inner peripheral side in the pad oil passage 58A reaches the outer periphery while flowing around, so that the oil stays in the pad region 57 for a long time, which is advantageous in terms of lubricity. However, the extension direction of the pad oil grooves 58 is not limited thereto, and the pad oil grooves 58 may be provided along the radial r direction about the rotation axis 20C. Further, when the pad oil grooves 58 are inclined with respect to the radial r direction about the rotation axis 20C, it can be configured as in a first modification illustrated in FIGS. and 6, a second modification illustrated in FIGS. 7 and 8, a third modification illustrated in FIGS. 9 and 10, and a fourth modification illustrated in FIGS. 11 and 12.

Figure 5:
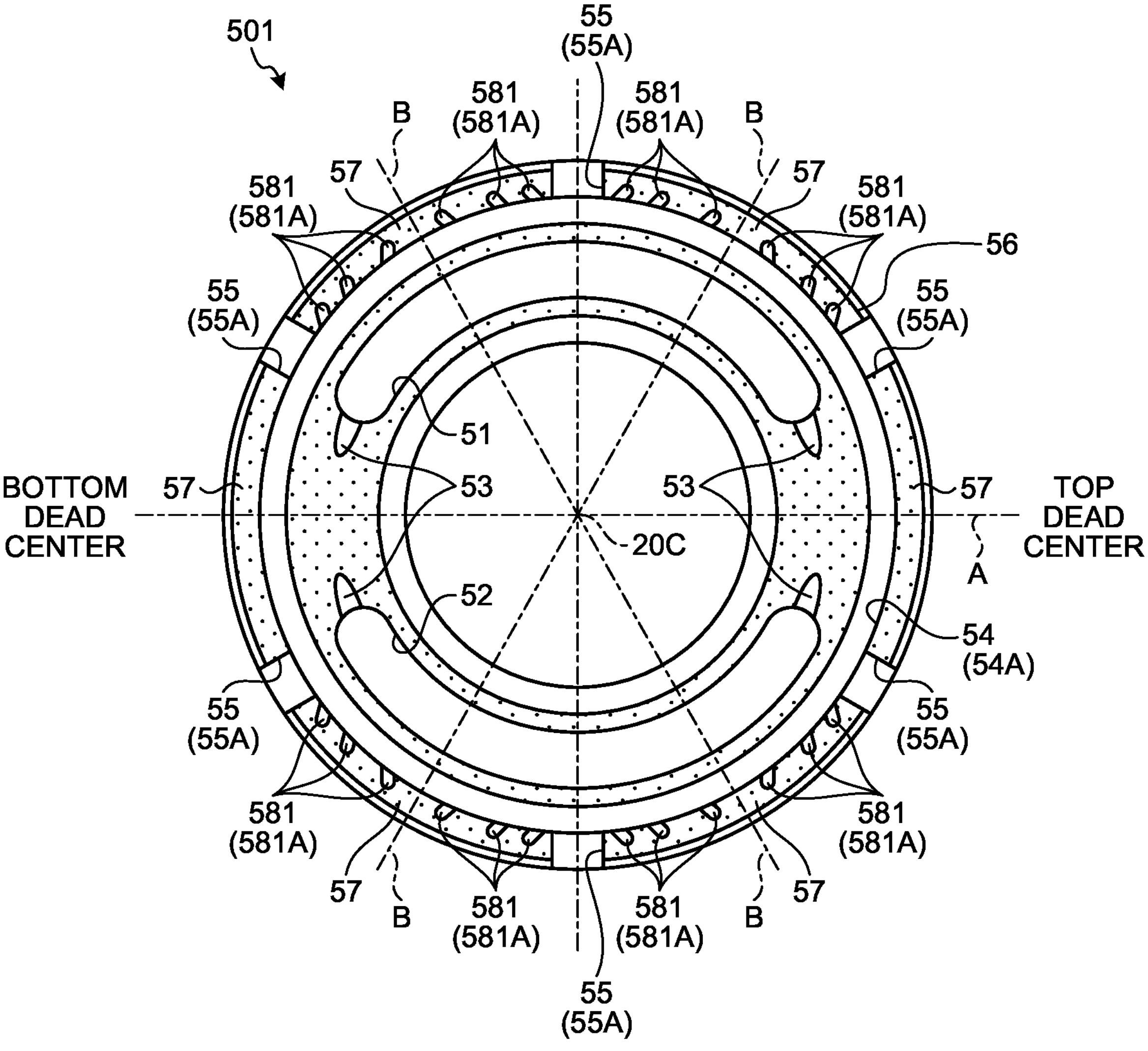
FIG. 5 is an end face diagram of a valve plate of a first modification.
Figure 6:
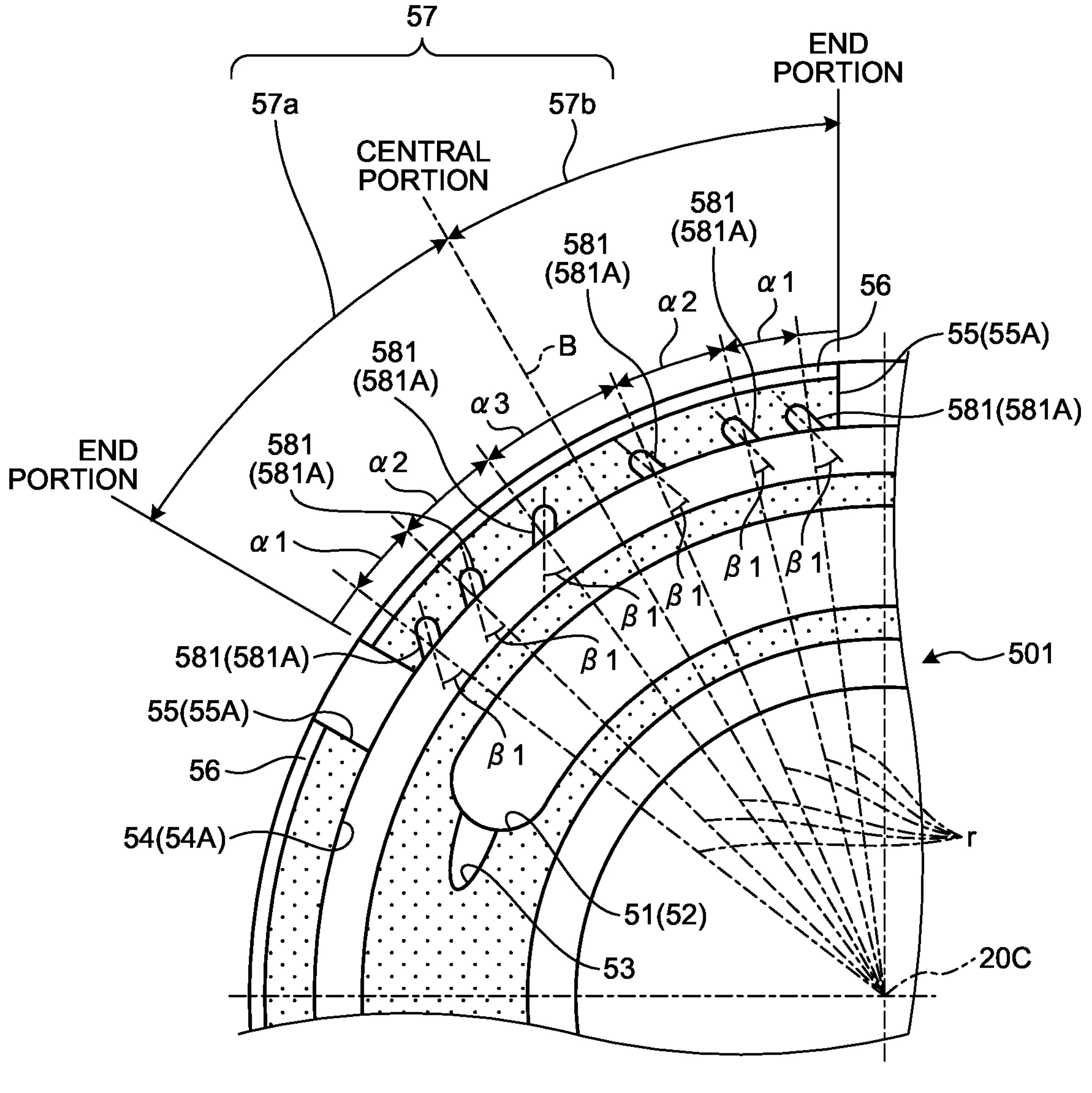
FIG. 6 is an enlarged diagram of a main part of the valve plate illustrated in FIG. 5.

That is, in a valve plate 501 of the first modification illustrated in FIGS. 5 and 6, inclination angles β1 of pad oil grooves 581 with respect to the radial r direction about the rotation axis 20C are about 30° in the direction opposite to that in the first embodiment. The pad oil grooves 581 provided in each of the half region portions 57*a* and 57*b* are symmetric with each other relative to the virtual plane B that divides the pad region 57 into two equal parts in the circumferential direction of the relative rotation. The pitch at which the pad oil grooves 581 are formed is similar to that in the first embodiment. According to the first modification, in the end portion on the downstream side of the relative rotation, the length of the side located on the downstream side in the pad oil groove 581 is longer than the length of the side on the inner peripheral side, and is located on the outer peripheral side. Therefore, even under a situation where the cylinder block 40 rotates at a relatively low speed such as 1000 rpm, the oil is supplied to the pad region 57 from the portion of the long side on the outer peripheral side in a pad oil passage 581A, which is advantageous in terms of lubricity. Note that, in the first modification, the same configurations as those of the first embodiment are denoted by the same reference numerals. Further, as in the first embodiment, a dot is provided at a contact part of the valve plate 501 with the cylinder block 40.

Figure 7:
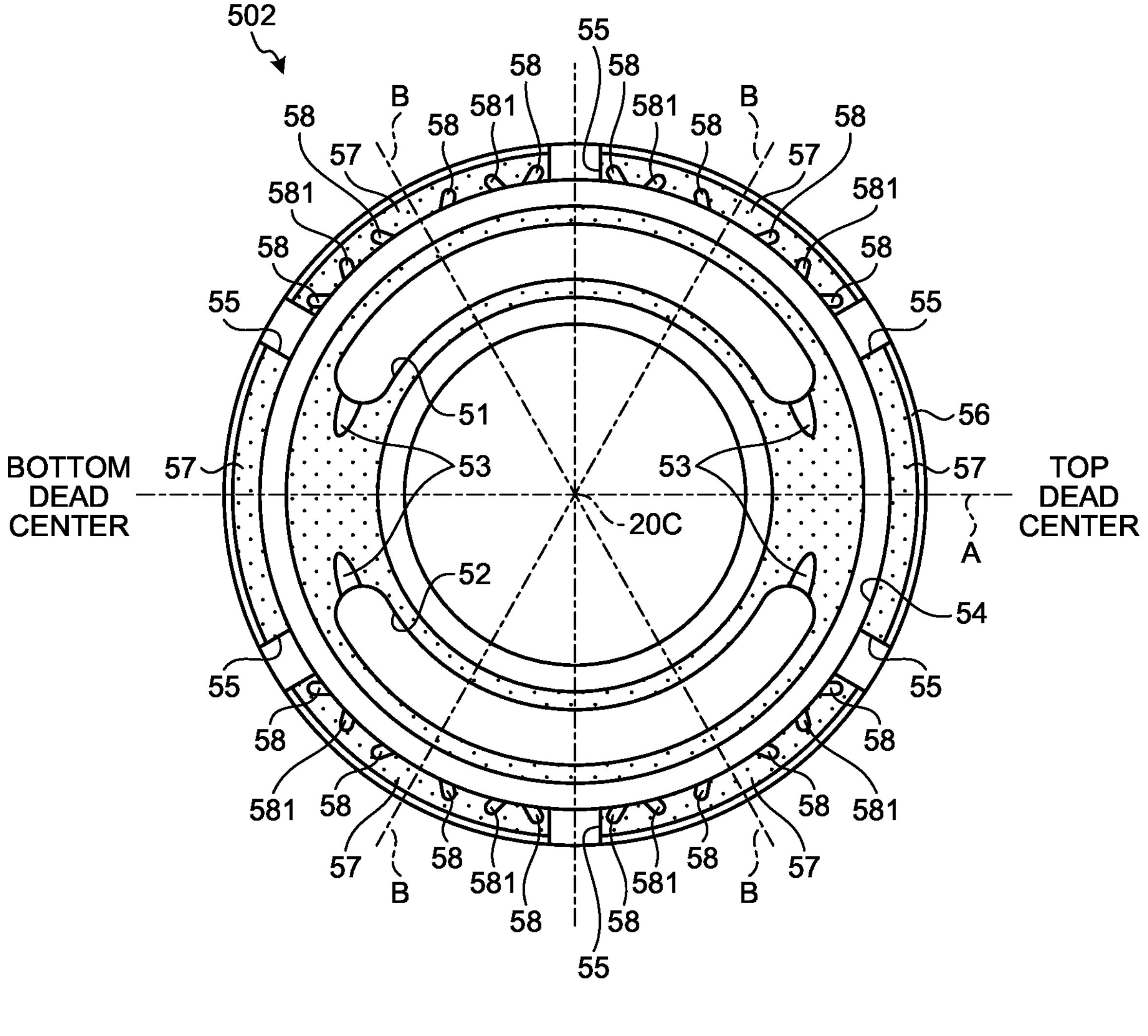
FIG. 7 is an end face diagram of a valve plate of a second modification.
Figure 8:
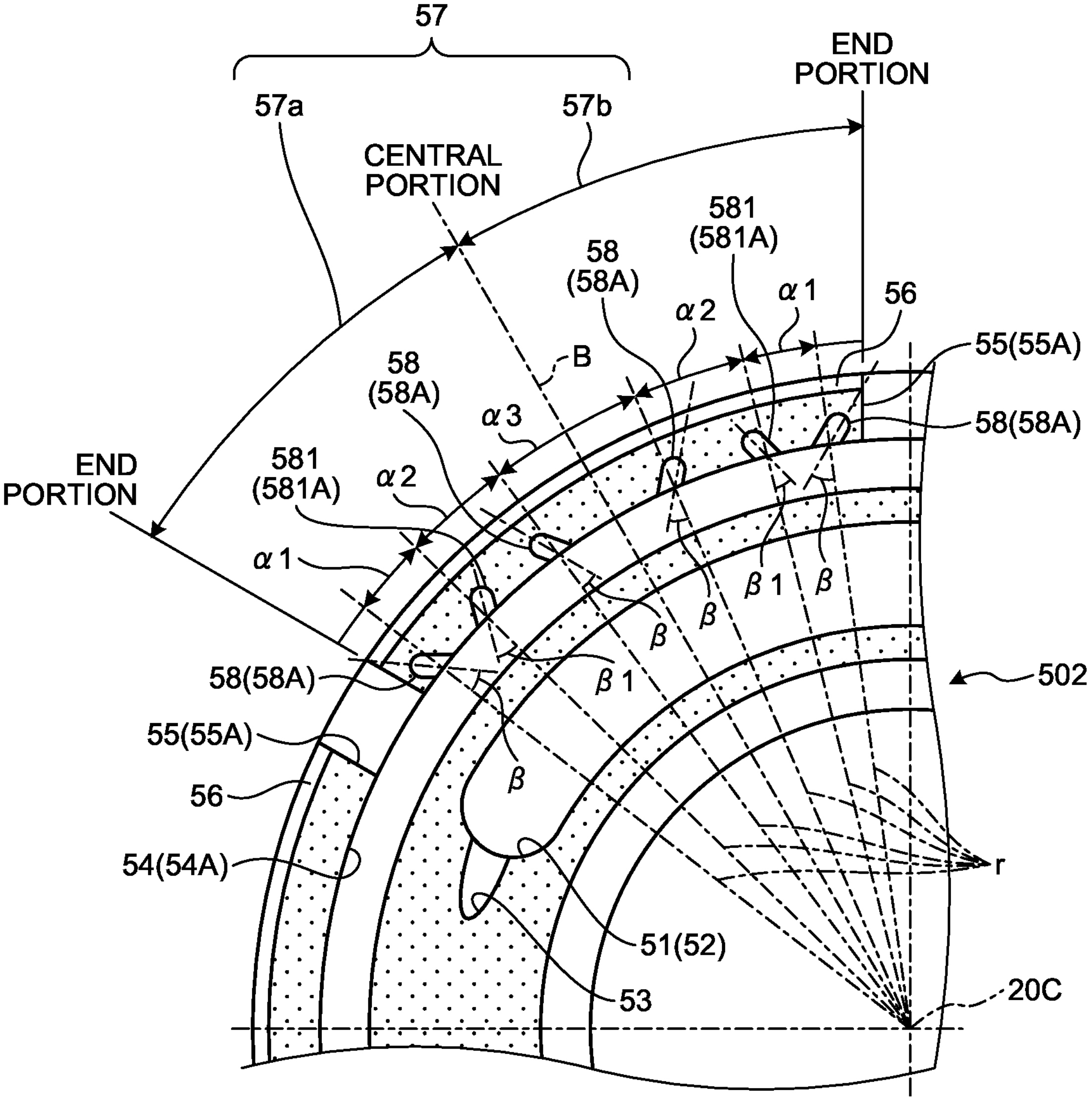
FIG. 8 is an enlarged diagram of a main part of the valve plate illustrated in FIG. 7.

In a valve plate 502 of the second modification illustrated in FIGS. 7 and 8, two types of pad oil grooves 58 and 581 the respective inclination directions of which are opposite to each other are provided with respect to the half region portions 57*a* and 57*b* obtained by dividing the pad region 57 into two equal parts in the circumferential direction of the relative rotation relative to the virtual plane B. That is, in the second modification, the pad oil grooves 58 inclined in a direction gradually approaching the radial oil groove 55 toward the outer periphery and the pad oil groove 581 inclined in a direction gradually separating from the radial oil groove 55 toward the outer periphery are alternately provided in each of the half region portions 57*a* and 57*b* of the pad region 57. The pad oil grooves 58 and 581 provided in each of the half region portions 57*a* and 57*b* are symmetric with each other relative to the virtual plane B. According to the second modification, lubricity can be improved in both relatively high speed rotation advantageous in the first embodiment and relatively constant speed rotation advantageous in the first modification. Note that, in the second modification, the same configurations as those of the first embodiment and the first modification are denoted by the same reference numerals. Further, as in the first embodiment, a dot is provided at a contact part of the valve plate 502 with the cylinder block 40.

Figure 9:
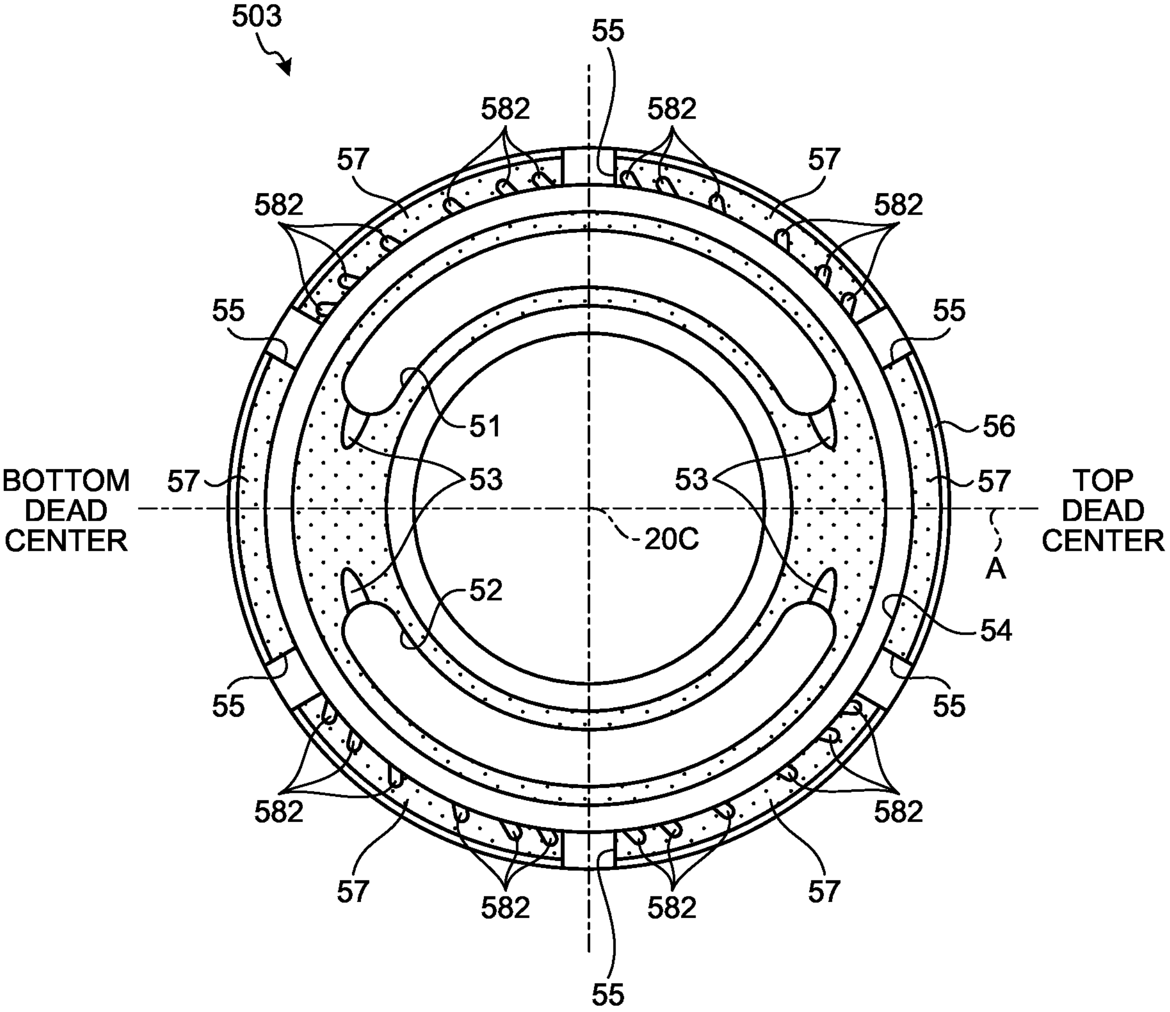
FIG. 9 is an end face diagram of a valve plate of a third modification.
Figure 10:
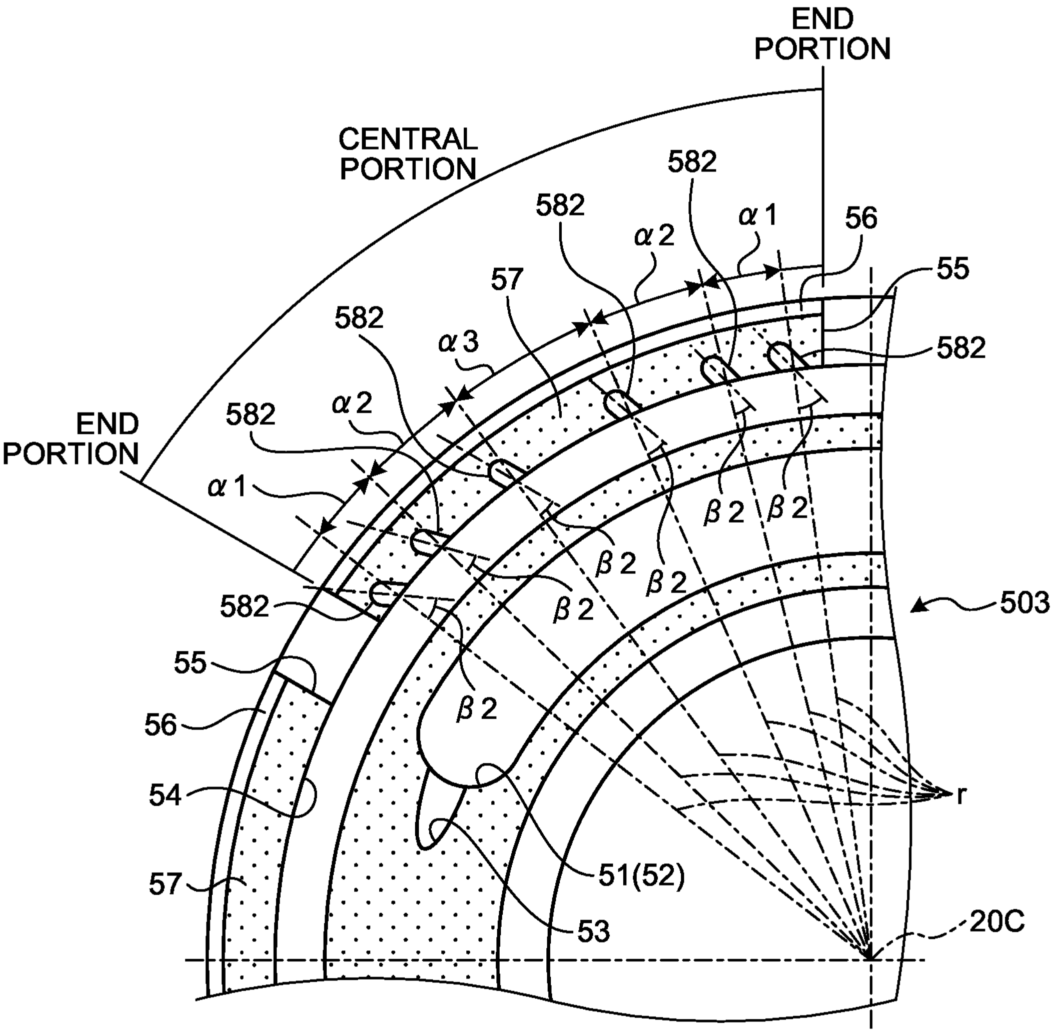
FIG. 10 is an enlarged diagram of a main part of the valve plate illustrated in FIG. 9.

In a valve plate 503 of the third modification illustrated in FIGS. 9 and 10, pad oil grooves 582 are inclined in the same direction in the entire part of each pad region 57. In a valve plate 504 of the fourth modification illustrated in FIGS. 11 and 12, pad oil grooves 583 are inclined in the same direction in the entire part of each pad region 57. In the third modification and the fourth modification, both inclination angles β2 of the pad oil grooves 582 and inclination angles β3 of the pad oil grooves 583 are 30°, and the inclination directions are opposite to each other. The pitch at which the pad oil grooves 582 and 583 are formed is similar to that in the first embodiment.

Figure 13:
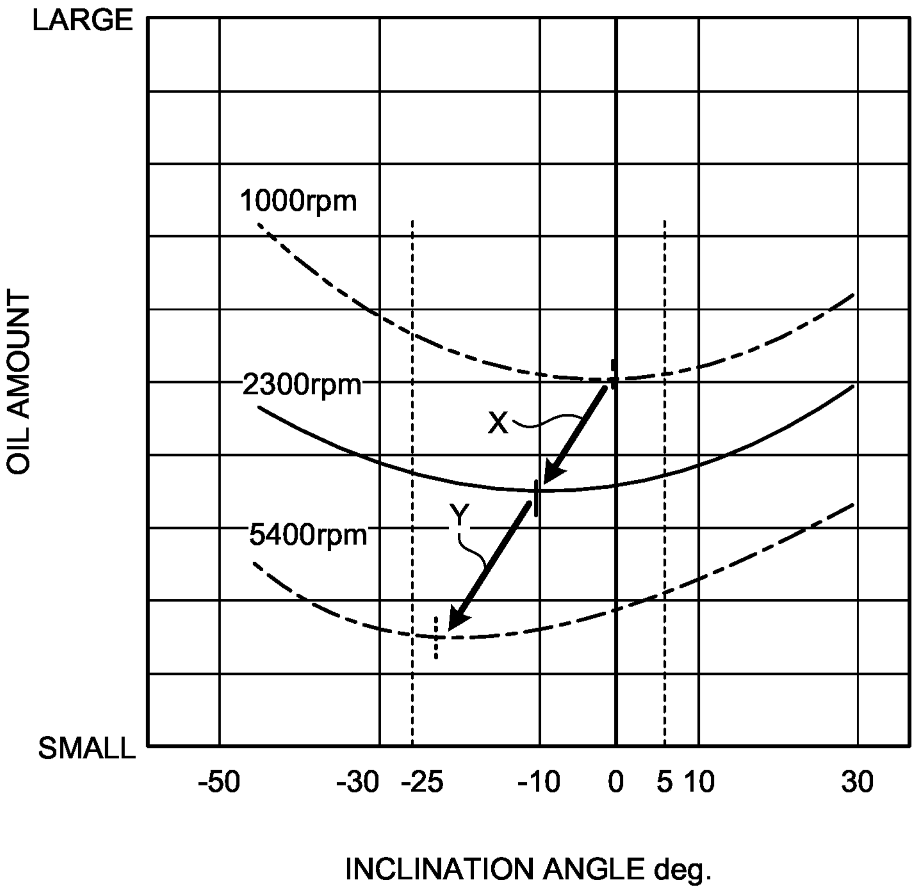
FIG. 13 is a graph illustrating a relationship between an inclination angle of a pad oil groove with respect to a rotation rate region of a cylinder block and an oil amount in the pad region.

FIG. 13 illustrates a relationship between the inclination angles of the pad oil grooves 58, 581, 582, and 583 with respect to a rotation rate region of the cylinder block 40 and an oil amount in the pad region 57. The inclination angle is 0° in the radial r direction about the rotation axis 20C. When the end portion of the pad region 57 on the downstream side of the relative rotation with respect to the cylinder block 40, that is, the outer peripheral side end of the pad oil groove is inclined to be on the downstream side as indicated by the region E in FIGS. 4A to 4D, it is indicated as "+". As indicated by a two-dot chain line in FIG. 13, when the cylinder block 40 rotates at a relatively low speed of about 1000 rpm, the pad oil grooves 58, 581, 582, and 583 are preferably inclined with respect to the radial r direction about the rotation axis 20C at an angle excluding the range of +5° to −10°. On the other hand, as indicated by a solid line or a one-dot chain line in FIG. 13, when the cylinder block 40 rotates at a relatively high speed of about 2300 rpm (solid line), 5400 rpm (one-dot chain line), or the like, the pad oil grooves 58, 581, 582, and 583 are preferably inclined with respect to the radial r direction about the rotation axis 20C at an angle excluding the range of +5° to −25°. That is, as indicated by arrows X and Y in FIG. 13, as the rotation speed of the cylinder block 40 increases, the position where the oil amount in the pad region 57 is minimized tends to shift to the "−" side of the inclination angle. Therefore, as a condition for inclining the pad oil grooves 58, 581, 582, and 583 without mutual interference, in a case where the cylinder block 40 rotates at a relatively low speed, it is preferable to set to be in a range on the left side of −10° in FIG. 13. Further, when the cylinder block 40 rotates at a relatively high speed, it is preferable to set the inclination angle of the pad oil grooves 58, 581, 582, and 583 so as to be in a range on the right side of +5° in FIG. 13.

Further, in each of the first embodiment and the first to fourth modifications described above, the outer peripheral side end of the pad oil grooves 58, 581, 582, and 583 is closed, but the present disclosure is not limited thereto. For example, it is also possible to configure as in a fifth modification illustrated in FIGS. 14 and 15 or a sixth modification illustrated in FIGS. 16 and 17.

Figure 14:
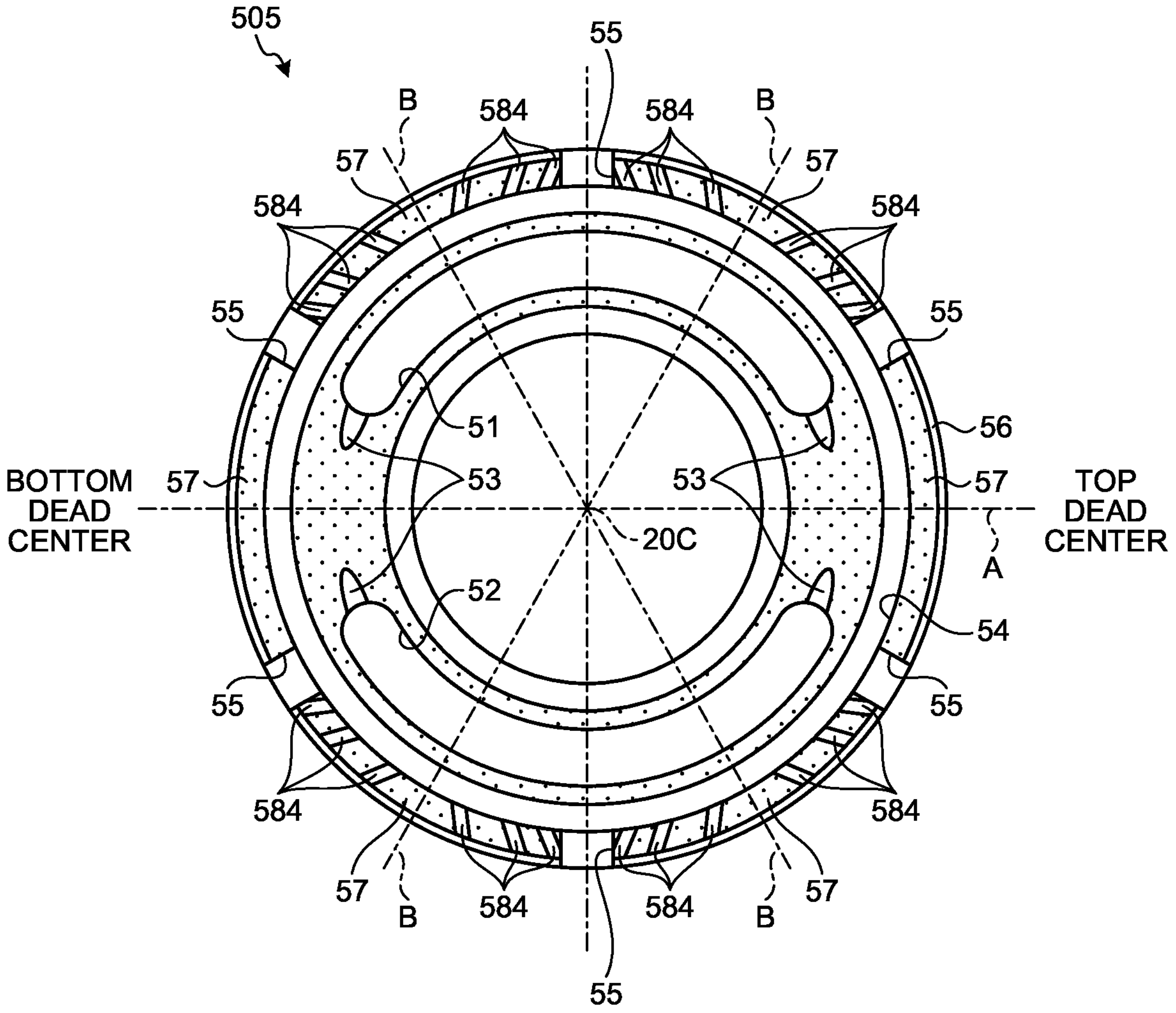
FIG. 14 is an end face diagram of a valve plate of a fifth modification.
Figure 15:
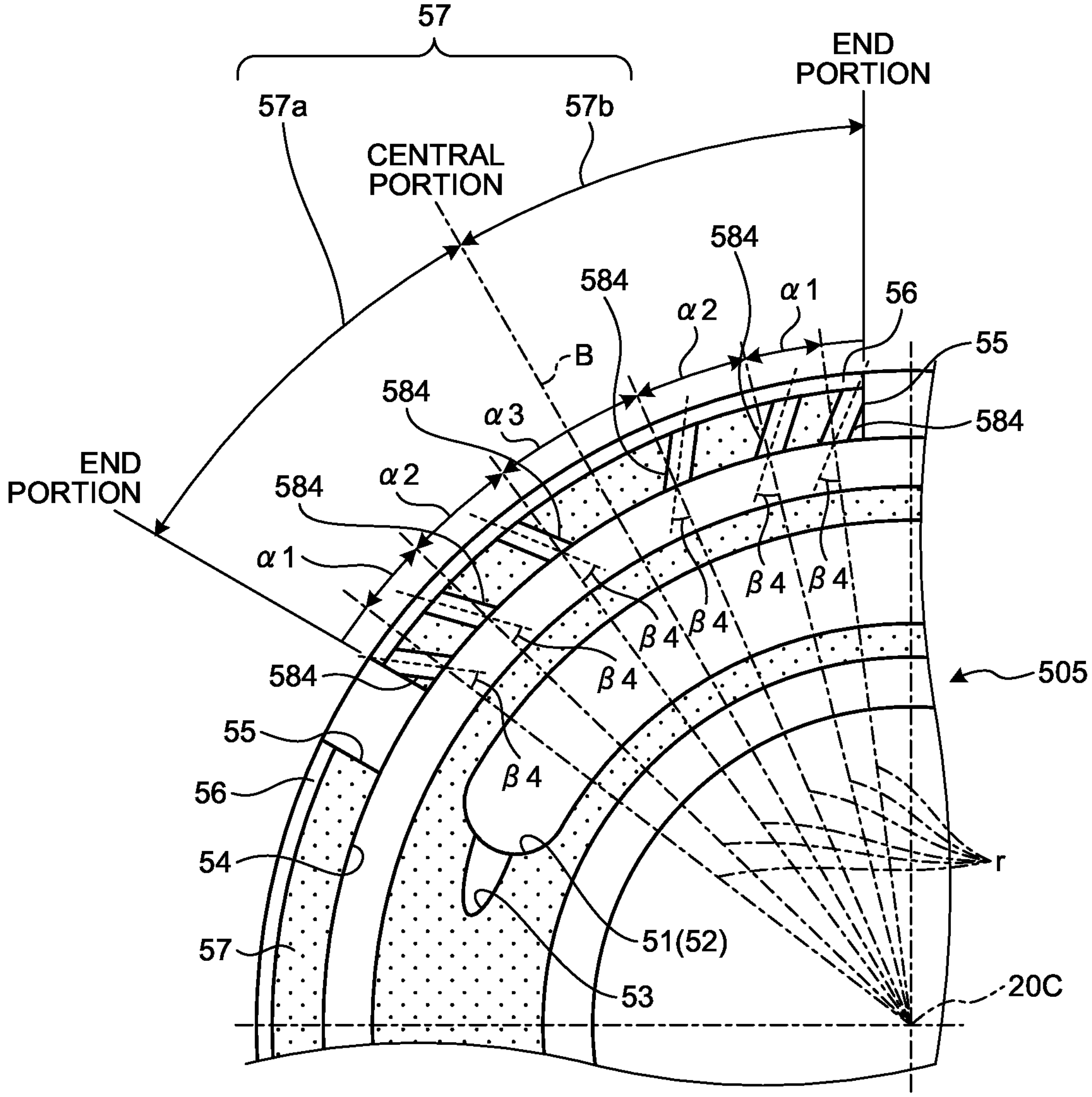
FIG. 15 is an enlarged diagram of a main part of the valve plate illustrated in FIG. 14.

That is, in a valve plate 505 of the fifth modification illustrated in FIGS. 14 and 15, an outer peripheral side end of pad oil grooves 584 is opened to the outer peripheral surface of the valve plate 505, similarly to the radial oil grooves 55. In the illustrated example, the pad oil grooves 584 are provided to be inclined so as to be opposite to each other with respect to each of the half region portions 57*a* and 57*b* obtained by dividing the pad region 57 into two equal parts relative to the virtual plane B. Inclination angles β4 of the pad oil grooves 584 are the same as each other, and are set to about 30° with respect to the radial r direction about the rotation axis 20C. The inclination direction of the pad oil grooves 584 is a direction gradually approaching the radial oil groove 55 toward the outer periphery in each of the half region portions 57*a* and 57*b*. The pitch at which the pad oil grooves 584 are formed is similar to that in the first embodiment. Note that, in the fifth modification, the same configurations as those of the first embodiment are denoted by the same reference numerals. Further, as in the first embodiment, a dot is provided at a contact part of the valve plate 505 with the cylinder block 40.

Figure 16:
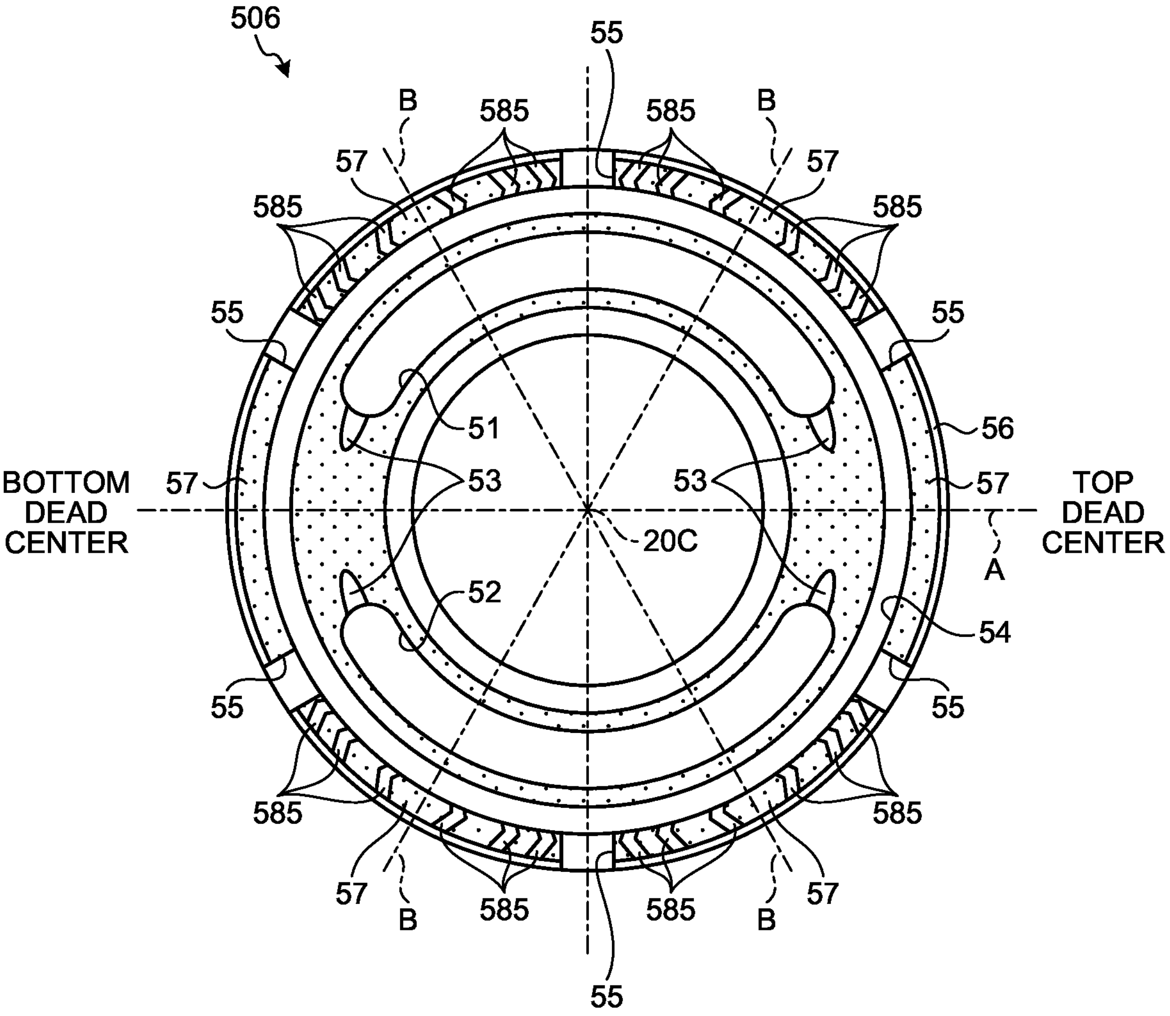
FIG. 16 is an end face diagram of a valve plate of a sixth modification.
Figure 17:
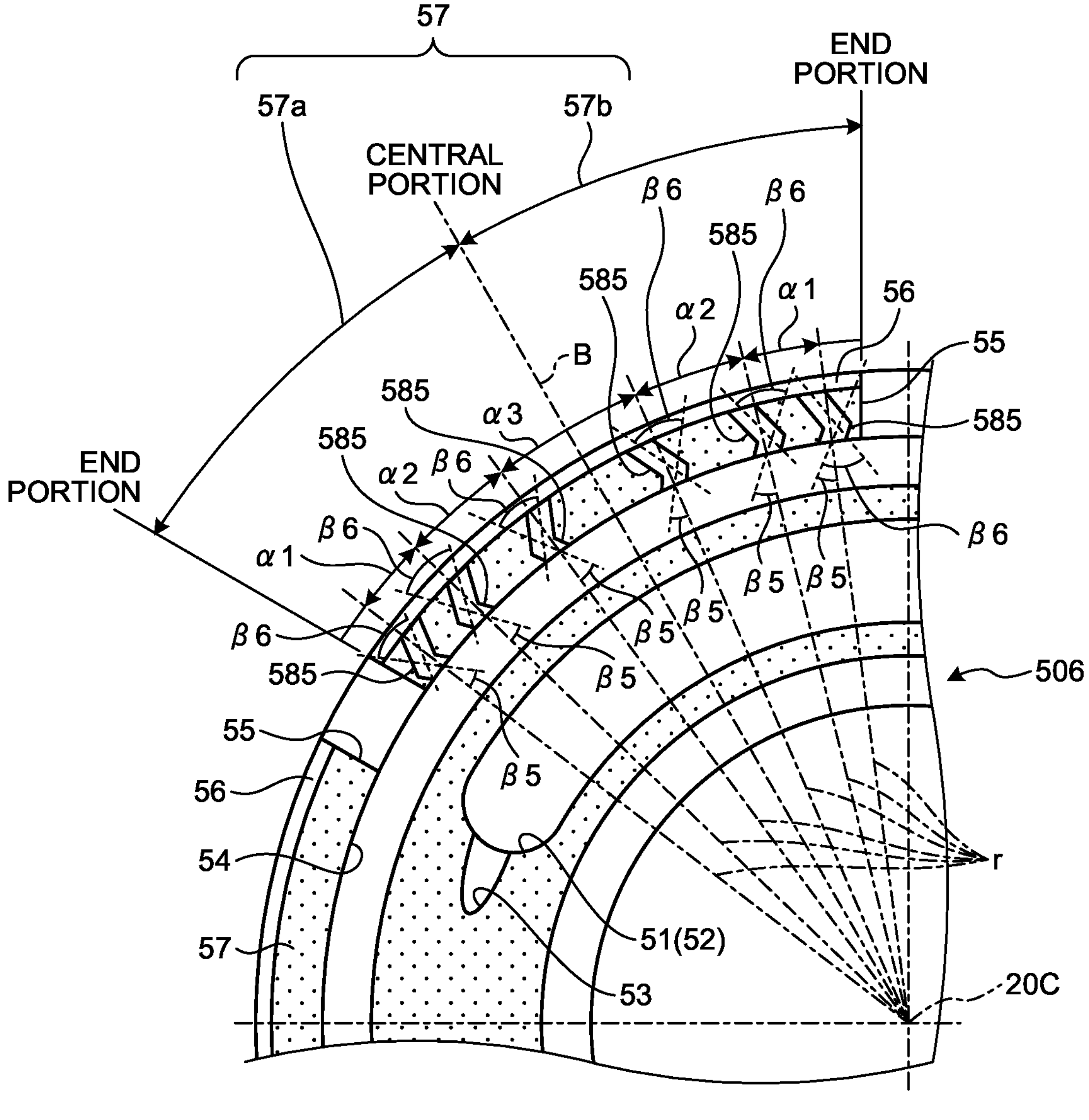
FIG. 17 is an enlarged diagram of a main part of the valve plate illustrated in FIG. 16.

In a valve plate 506 of the sixth modification illustrated in FIGS. 16 and 17, the pad oil grooves 584 described in the fifth modification are bent in the middle, and an outer peripheral side portion of pad oil grooves 585 is inclined to the side opposite to the inner peripheral side. The inclination angle of the pad oil grooves 585 with respect to the radial r direction about the rotation axis 20C is β5=about 30° at the inner peripheral side portion. Bending angles are β6=about 60° between the inner peripheral side portion and the outer peripheral side portion. The bent position of the pad oil grooves 585 is substantially the same distance from the rotation axis 20C. Note that, in the sixth modification, the same configurations as those of the first embodiment are denoted by the same reference numerals. Further, as in the first embodiment, a dot is provided at a contact part of the valve plate 506 with the cylinder block 40.

According to the fifth modification and the sixth modification, since the outer peripheral side end of the pad oil grooves 584 and 585 is opened, the supply of the oil from the annular oil groove 54 to the pad oil grooves 58 is promoted even under a condition of relatively low speed rotation, which is advantageous in terms of lubricity. In addition, in the sixth modification, the inclination angle of the pad oil grooves 58 is reversed in the middle relative to the radial r direction about the rotation axis 20C. For this reason, lubricity can be improved in both the case of driving at relatively low speed rotation and the case of driving at relatively high speed rotation.

Second Embodiment

Figure 18A:
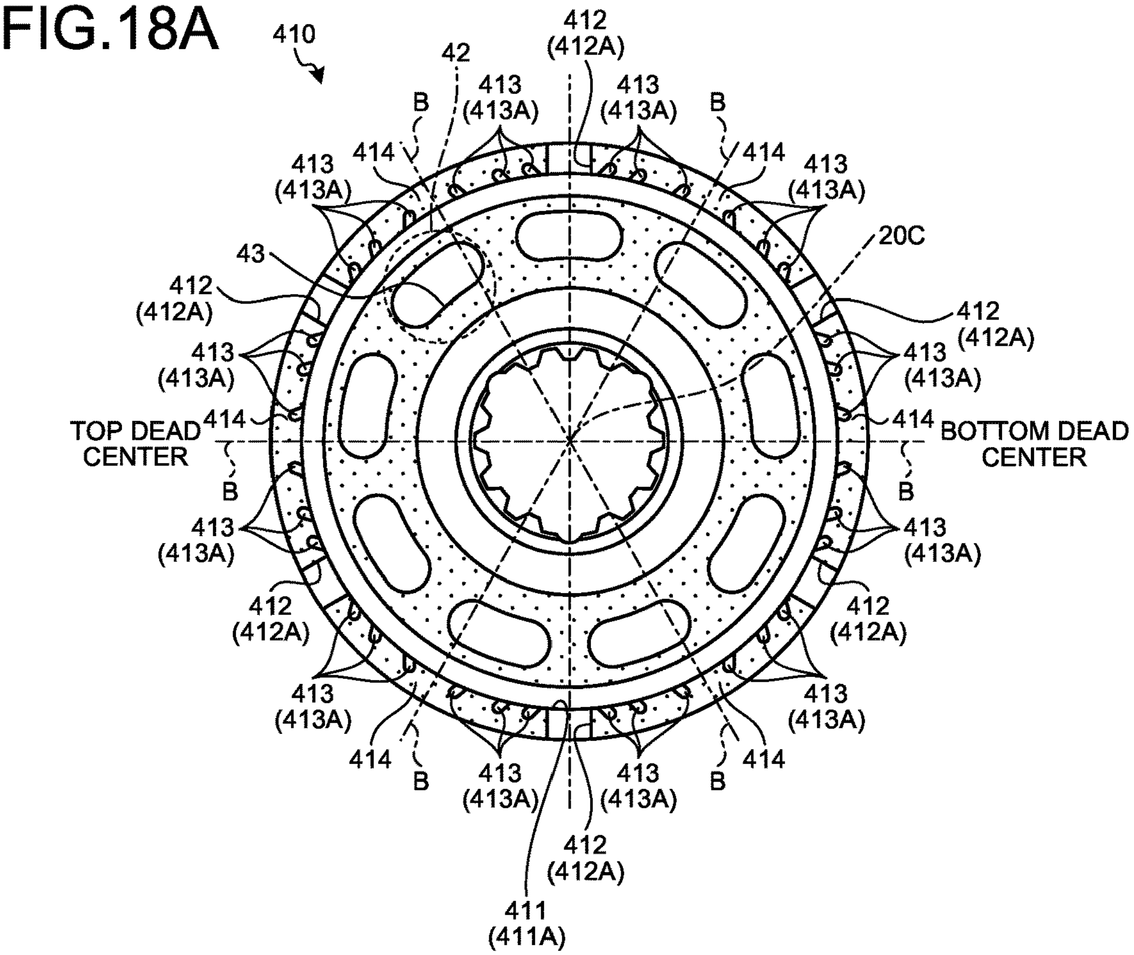
FIG. 18A illustrates components of a hydraulic motor of a second embodiment of the present disclosure, and is an end face diagram of a cylinder block.
Figure 18B:
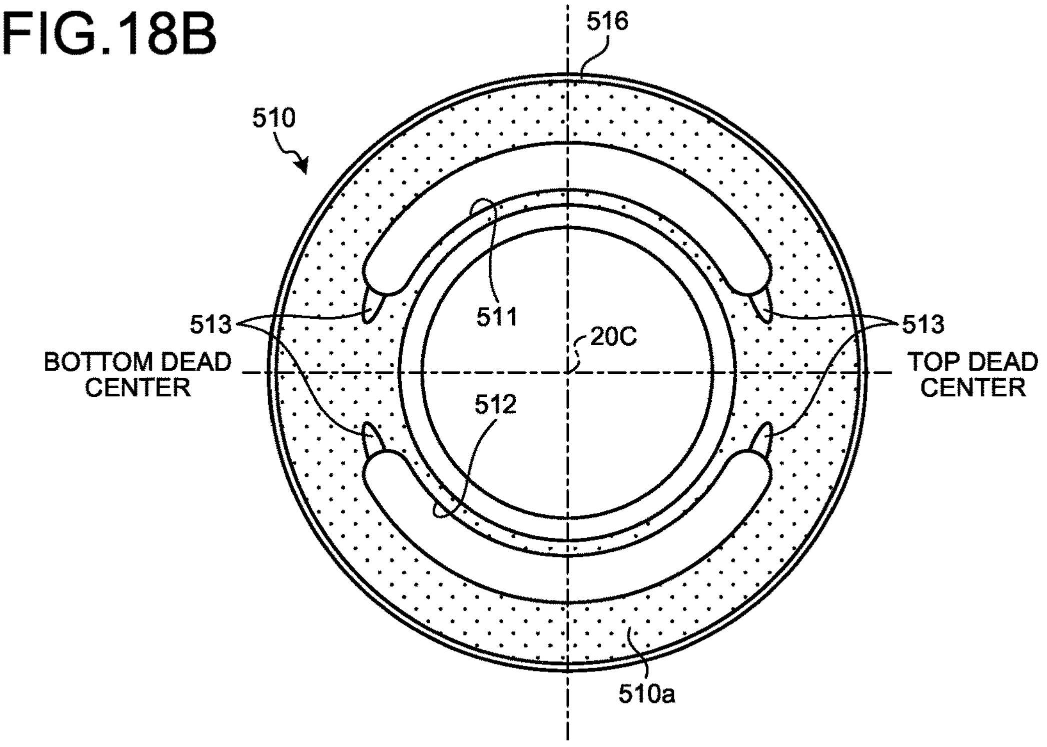
FIG. 18B illustrates components of the hydraulic motor of the second embodiment of the present disclosure, and is an end face diagram illustrating a contact surface of a valve plate with a cylinder block.
Figure 19:
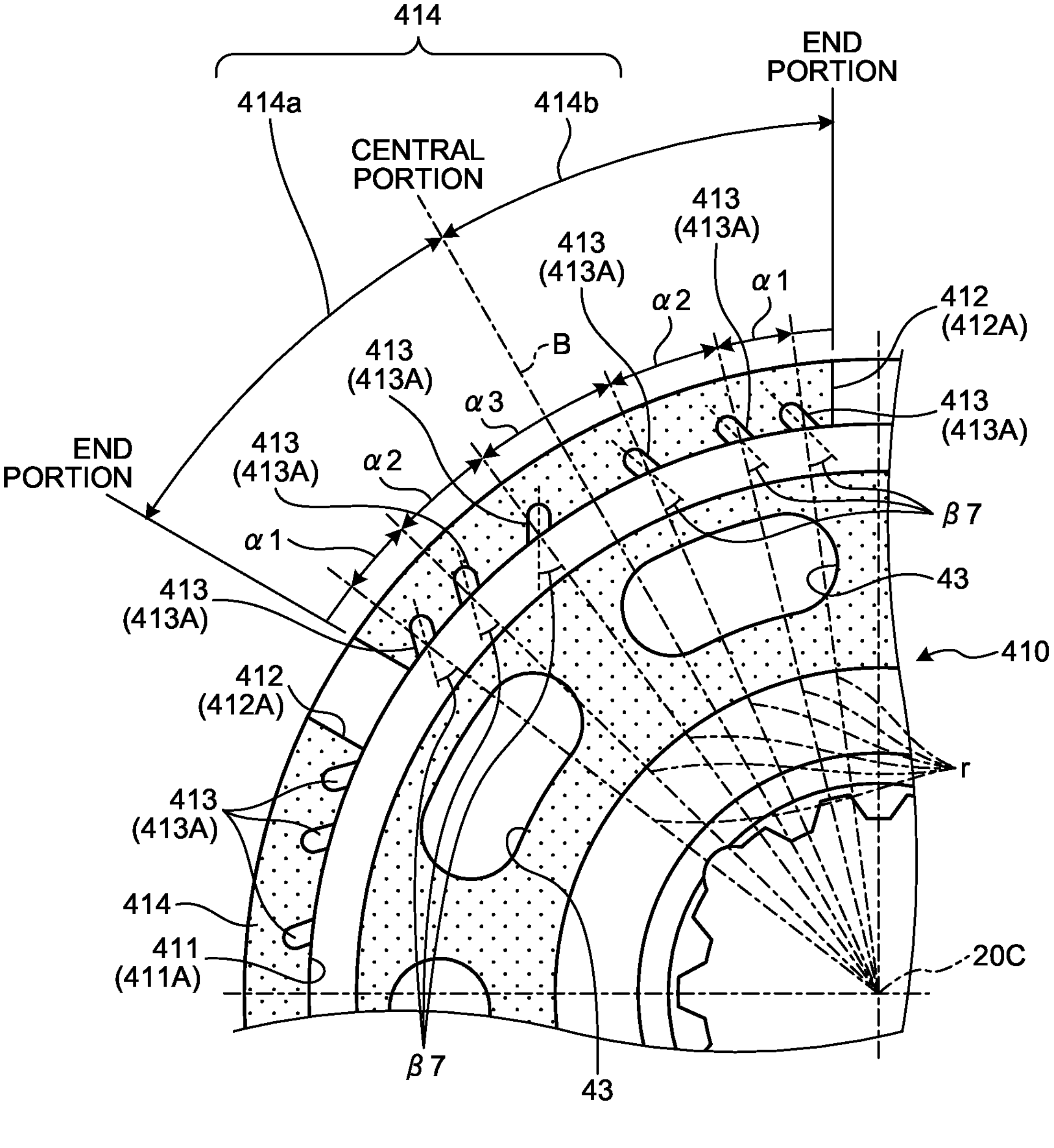
FIG. 19 is an enlarged diagram of a main part of the cylinder block illustrated in FIG. 18A.

FIGS. 18A, 18B, and 19 illustrate a cylinder block 410 and a valve plate 510 applied to a hydraulic motor of the second embodiment of the present disclosure. As in the first embodiment, the cylinder block 410 and the valve plate 510 exemplified here are of an axial type that is bidirectionally rotationally driven suitable as a traveling motor that causes a work machine such as an excavator to travel. The cylinder block 410 and the valve plate 510 of the second embodiment are different from those of the first embodiment in that an annular oil groove (first oil groove) 411, radial oil grooves (second oil grooves) 412, and pad oil grooves 413 are formed in the cylinder block 410. Hereinafter, portions different from those of the first embodiment will be described, and the same reference numerals will be given to common configurations, and detailed description thereof will be omitted.

As illustrated in FIG. 18B, in the second embodiment, the valve plate 510 is provided with a first pressure port 511, a second pressure port 512, and notches 513, and an outermost peripheral groove 516 is provided in the outermost peripheral portion.

On the other hand, as illustrated in FIG. 18A, the cylinder block 410 is provided with the annular oil groove 411 and the plurality of radial oil grooves 412. The annular oil groove 411 is an endless annular recess provided in an outer peripheral portion with respect to the communication ports 43 of the cylinder bores 42. The annular oil groove 411 has, for example, a substantially semicircular cross section with a constant radius, and is open only on a surface facing an end face 510*a* of the valve plate 510. The radial oil grooves 412 are linear recesses extending from the annular oil groove 411 toward the outer periphery, and are formed at equal interval positions along the circumferential direction. The radial oil grooves 412 have, for example, a substantially semicircular cross section with a constant radius, are open on a surface facing the end face 510*a* of the valve plate 510, and have outer peripheral side ends open on the outer peripheral surface of the cylinder block 410. In the present second embodiment, the six radial oil grooves 412 are formed radially along the radial r direction about the rotation axis 20C in an outer peripheral side portion with respect to the annular oil groove 411.

Further, in the cylinder block 410, the pad oil grooves 413 are provided in all pad regions 414 formed between the radial oil grooves 412 in an outer peripheral portion with respect to the annular oil groove 411. The pad oil grooves 413 are linear recesses having one end communicating with the annular oil groove 411 and the other end closed, and a plurality of pad oil grooves 413 is formed in each of the six pad regions 414. The pad oil grooves 413 have, for example, a substantially semicircular cross section with a constant radius, and are open on a surface facing the end face 510*a* of the valve plate 510. The width of the pad oil groove 413 is smaller than that of the radial oil groove 412. The length of the pad oil groove 413 is provided between the annular oil groove 411 and a portion that is approximately ½ of the dimension along the radial direction of the pad region 414. As is apparent from FIG. 19, the plurality of pad oil grooves 413 is provided at unequal pitches such that a mutual interval gradually increases from end portions close to the radial oil grooves 412 on both sides toward a central portion in the circumferential direction of relative rotation with the valve plate 510 about the rotation axis 20C. In particular, in the second embodiment, the pad oil grooves 413 provided in each of half region portions 414*a* and 414*b* are symmetric with each other relative to a virtual plane B that divides the pad region 414 into two equal parts in the circumferential direction of the relative rotation. Specifically, the pad oil grooves 413 are arranged at positions of $\alpha 1$=about 6.4° and $\alpha 2$=about 9.5° from the pad oil groove 413 at the end portions closest to the radial oil grooves 412 toward the central portion in the circumferential direction of the relative rotation. In each of the half region portions 414*a* and 414*b* of the pad region 414 having the virtual plane B as a boundary, the pad oil grooves 413 located in the central portion farthest away from the radial oil groove 412 have $\alpha 3$=about 12.8° therebetween. Thus, the proportion of the opening area of the pad oil groove 413 to the end face 510*a* of the valve plate 510 is larger at two end portions close to the respective radial oil groove 412 than at the central portion separated from the two radial oil grooves 412 on both sides in the pad region 414.

Furthermore, each of the pad oil grooves 413 is inclined with respect to the radial r direction about the rotation axis 20C. In the illustrated example, the pad oil grooves 413 are provided to be inclined so as to be opposite to each other in the half region portions 414*a* and 414*b* of the pad region 414 having the virtual plane B as a boundary. Inclination angles $\beta 7$ of the pad oil grooves 413 are the same as each other, and are set to about 30° with respect to the radial r direction about the rotation axis 20C. The inclination direction of the pad oil grooves 413 is a direction gradually separating from the radial oil groove 412 toward the outer periphery in each of the half region portions 414*a* and 414*b*.

In the hydraulic motor configured as described above, the end face of the cylinder block 410 contacts the valve plate 510, so that the annular oil groove 411 constitutes an endless annular oil passage 411A with respect to the valve plate 510. Similarly, a plurality of radial oil passages 412A opened from the endless annular oil passage 411A to the housing chamber 13 is formed with respect to the valve plate 510 by the radial oil grooves 412. Therefore, while the cylinder block 410 is rotating, the oil leaking from the pressure ports 511 and 512 lubricates between the cylinder block 410 and the valve plate 510. The oil after lubrication between the cylinder block 410 and the valve plate 510 is discharged to the housing chamber 13 via the endless annular oil passage 411A and the radial oil passages 412A. Further, a part of the oil passing through the radial oil passages 412A reaches the pad region 414 as a result of the rotation of the cylinder block 410 and lubricates between the cylinder block 410 and the valve plate 510. Therefore, a sufficient oil film can be secured in an inner peripheral side portion with respect to the endless annular oil passage 411A and a portion close to the radial oil passages 412A on the upstream side of the relative rotation in the pad region 414, and there is no possibility that problems such as seizure and galling due to oil shortage occur.

On the other hand, the oil from the radial oil passages 412A hardly reaches the portion on the downstream side of the relative rotation in the pad region 414. For this reason, it is difficult to sufficiently secure the oil film only by the oil passing through the radial oil passages 412A. However, in the hydraulic motor described above, the pad oil grooves 413 are provided in the end portions on both sides close to the radial oil passages 412A in the pad region 414. When the cylinder block 410 contacts the valve plate 510, the pad oil grooves 413 constitute pad oil passages 413A that communicate the endless annular oil passage 411A with both side end portions of the pad region 414. Thus, the oil in the endless annular oil passage 411A is supplied to the portion on the downstream side of the relative rotation in the pad region 414 through the pad oil passages 413A. Therefore, even when the hydraulic motor is increased in pressure and speed, there is no possibility of causing oil shortage, and there is no concern that problems such as seizure and galling occur. Moreover, the pad oil grooves 413 are provided in the pad region 414 which the outer peripheral portion of the cylinder block 410 contacts such that the proportion of the opening area to the end face 510*a* (see FIGS. 18A and 18B) of the valve plate 510 is larger at the end portion than at the central portion. For this reason, a contact part with the cylinder block 410 can be secured in the central portion of the pad region 414. As a result, there is no concern that the rotation of the cylinder block 410 becomes unstable due to the provision of the pad oil grooves 413, and high pressure and high speed of the hydraulic motor can be realized.

Note that, in the second embodiment described above, nine cylinder bores 42 are provided in the cylinder block 410, and six radial oil grooves 412 are linearly provided as an example, but the number of cylinder bores 42 and the shape and number of radial oil grooves 412 are not limited to those of the second embodiment.

Figure 20:
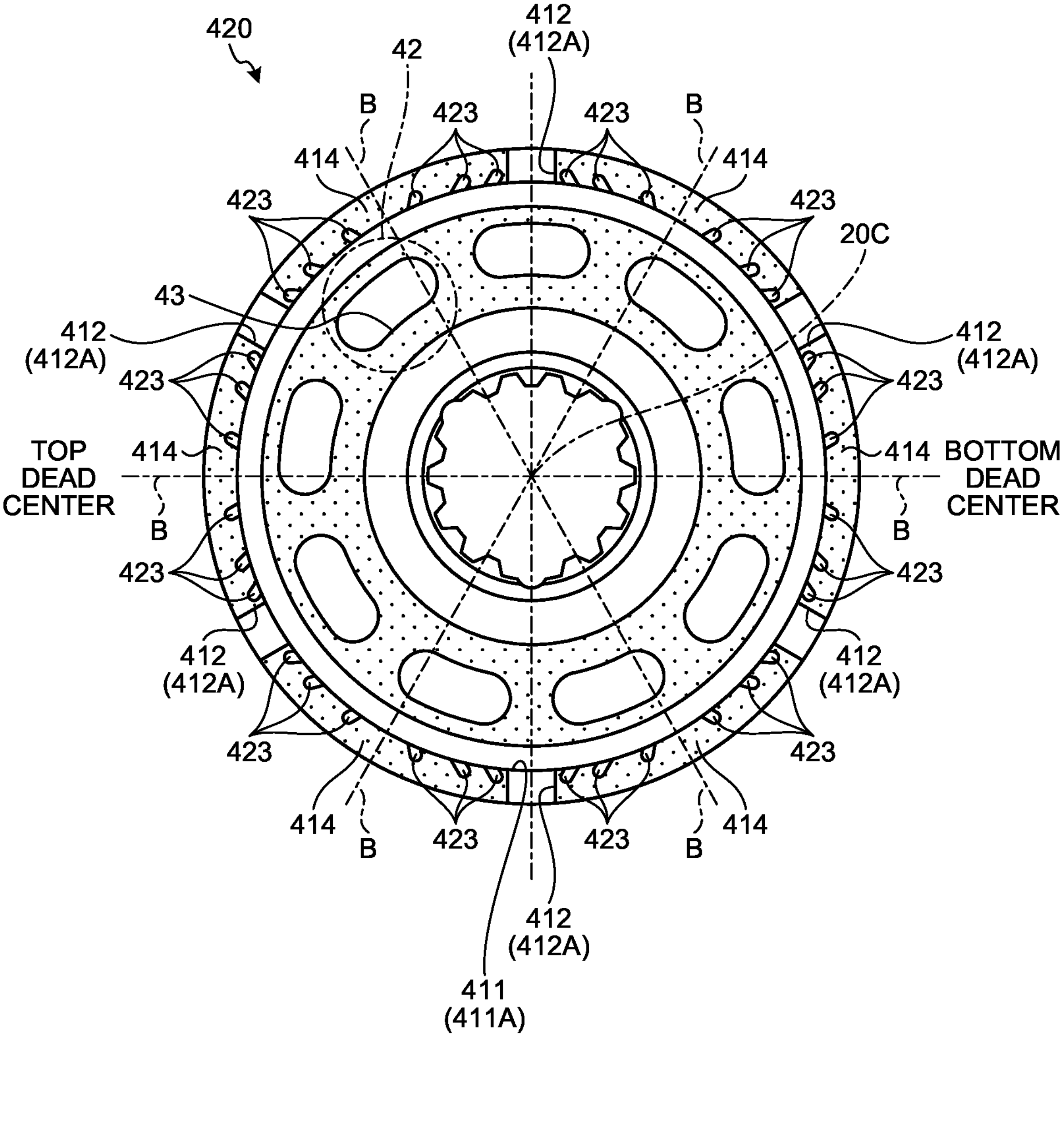
FIG. 20 is an end face diagram of a cylinder block of a seventh modification.
Figure 21:
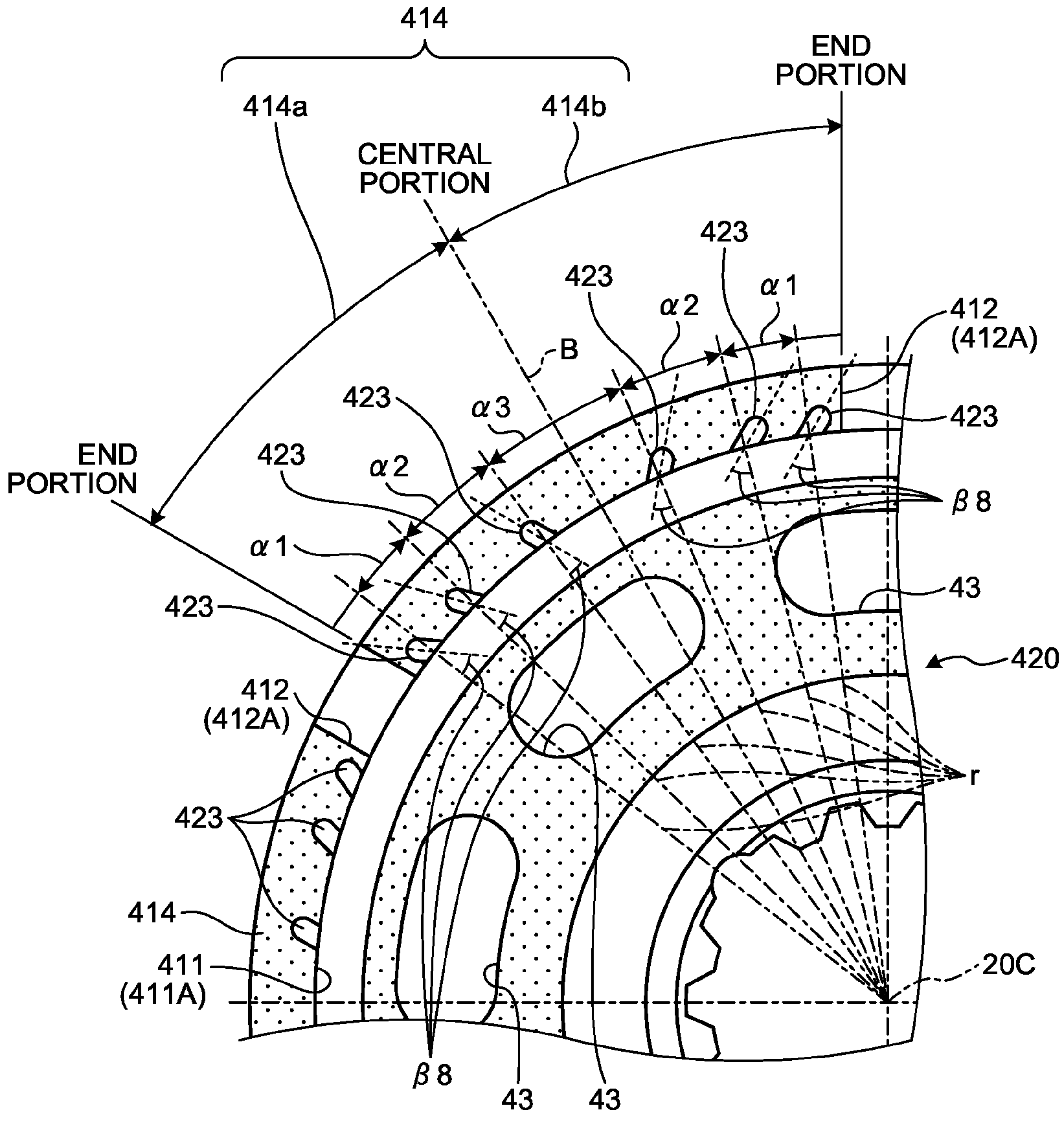
FIG. 21 is an enlarged diagram of a main part of the cylinder block illustrated in FIG. 20.

Further, in the second embodiment described above, the pad oil grooves 413 are inclined with respect to the radial r direction about the rotation axis 20C, but the pad oil grooves 413 may be provided along the radial r direction about the rotation axis 20C. Further, as in a cylinder block 420 of a seventh modification illustrated in FIGS. 20 and 21, pad oil grooves 423 may be provided to be inclined in a direction opposite to that in the second embodiment, that is, in a direction gradually separating from the radial oil groove 412 toward the outer periphery with respect to each of the half region portions 414*a* and 414*b* obtained by dividing the pad region 414 into two equal parts in the circumferential direction of the relative rotation relative to the virtual plane B. In the illustrated example, the pad oil grooves 423 provided in each of the half region portions 414*a* and 414*b* are symmetric with each other relative to the virtual plane B. Inclination angles β8 of the pad oil grooves 423 with respect to the radial r direction about the rotation axis 20C are about 30° in the direction opposite to that in the second embodiment. Note that, in the seventh modification, the same configurations as those of the second embodiment are denoted by the same reference numerals. Further, as in the second embodiment, a dot is provided at a contact part of the cylinder block 420 with the valve plate 510. Further, it is also possible to apply the pad grooves described as the second to sixth modifications of the first embodiment to the cylinder block.

Furthermore, in each of the first embodiment, the first to sixth modifications, the second embodiment, and the seventh modification described above, the annular oil groove and the radial oil grooves are provided in the same member. However, as long as the radial oil grooves and the pad oil grooves are provided in the same member, the annular oil groove and the radial oil grooves may be provided in different members.

Furthermore, by providing the pad oil grooves having the same dimension at unequal pitches, the proportion of the opening area of the pad oil grooves is changed between the upstream side and the downstream side of the relative rotation, but the present disclosure is not limited thereto. For example, it is also possible to change the proportion of the opening area of the pad oil grooves between the upstream side and the downstream side of the relative rotation by providing a plurality of pad oil grooves having different opening widths and a plurality of pad oil grooves having different extension lengths at equal intervals. Further, when the plurality of pad oil grooves is inclined with respect to the radial direction about the rotation axis, the pad oil grooves are inclined at the same angle, but the inclination angles of the plurality of pad oil grooves may be different from each other.

Furthermore, in each of the first embodiment, the first to sixth modifications, the second embodiment, and the seventh modification described above, the cylinder block and the valve plate are in sliding contact with each other via a flat surface as an example, but the present disclosure is not limited thereto. For example, it can also be applied to a configuration in which the valve plate is configured to be a convex spherical surface, the opposing end face of the cylinder block is configured to be a concave spherical surface, and the cylinder block and the valve plate are configured to be in sliding contact with each other via these spherical surfaces.

REFERENCE SIGNS LIST

20C ROTATION AXIS
40, 410, 420 CYLINDER BLOCK
40*a* END FACE OF CYLINDER BLOCK
42 (42B, 42T) CYLINDER BORE
50, 501, 502, 503, 504, 505, 506, 510 VALVE PLATE
51, 511 FIRST PRESSURE PORT
52, 512 SECOND PRESSURE PORT
54, 411 ANNULAR OIL GROOVE
55, 412 RADIAL OIL GROOVE
57, 414 PAD REGION
57*a*, 57*b*, 414*a*, 414*b* HALF REGION PORTION
58, 413, 423, 581, 582, 583, 584, 585 PAD OIL GROOVE
510*a* END FACE OF VALVE PLATE
B VIRTUAL PLANE DIVIDING PAD REGION INTO TWO EQUAL PARTS IN CIRCUMFERENTIAL DIRECTION OF RELATIVE ROTATION

The invention claimed is:

1. A valve plate of a hydraulic motor, the valve plate comprising a first pressure port and a second pressure port on a circumference about a rotation axis, a first oil groove provided to be endless in an outer peripheral part with respect to the first pressure port and the second pressure port, and a plurality of second oil grooves extending from the first oil groove toward an outer periphery, the first pressure port and the second pressure port being alternately communicated with a cylinder bore provided in a cylinder block by bidirectional relative rotation about the rotation axis in a state of being in contact with an end face of the cylinder block, wherein a plurality of pad oil grooves communicating with the first oil groove and opened toward the end face of the cylinder block is provided in outer peripheral portions of the first pressure port and the second pressure port in a pad region contacting the end face of the cylinder block between the second oil grooves, and the plurality of pad oil grooves is provided such that a proportion of an opening area to the end face of the cylinder block is larger at two end portions close to the second oil grooves than at a central portion separated from the second oil grooves in a circumferential direction of relative rotation.

2. The valve plate according to claim 1, wherein the plurality of pad oil grooves has a same extension length from the first oil groove and a same opening width with respect to the end face of the cylinder block, and is provided at unequal pitches such that a mutual interval gradually increases from the end portions on both sides toward the central portion in the pad region.

3. The valve plate according to claim 1, wherein outer peripheral side ends of the plurality of pad oil grooves are closed.

4. The valve plate according to claim 1, wherein the plurality of pad oil grooves is provided so as to be symmetric with each other with respect to a virtual plane that divides the pad region into two equal parts in a circumferential direction of relative rotation.

5. The valve plate according to claim 1, wherein each of the plurality of pad oil grooves extends linearly and is inclined with respect to a radial direction about the rotation axis.

6. The valve plate according to claim 5, wherein the plurality of pad oil grooves provided in one half region portion with respect to a virtual plane that divides the pad region into two equal parts in a circumferential direction of relative rotation is inclined in a same direction with respect to a radial direction about the rotation axis.

7. The valve plate according to claim 4 or 6, wherein the plurality of pad oil grooves provided in one half region portion and the plurality of pad oil grooves provided in another half region portion with respect to the virtual plane are inclined in directions opposite to each other.

8. The valve plate according to claim 6, wherein the plurality of pad oil grooves provided in one half region portion and the plurality of pad oil grooves provided in another half region portion with respect to the virtual plane are inclined in a same direction.

9. A hydraulic motor comprising the valve plate according to claim 1.

10. A cylinder block of a hydraulic motor, the cylinder block comprising a plurality of cylinder bores around a rotation axis, a first oil groove provided to be endless in an outer peripheral part with respect to the cylinder bores on an end face where the plurality of cylinder bores is opened, and a plurality of second oil grooves extending from the first oil groove toward an outer periphery, the plurality of cylinder bores being alternately communicated with a first pressure port and a second pressure port provided in a valve plate by bidirectional relative rotation in a state where the end face is in contact with the valve plate, wherein a plurality of pad oil grooves communicating with the first oil groove and opening toward the valve plate is provided in a pad region contacting the valve plate between the second oil grooves, and the plurality of pad oil grooves is provided such that a proportion of an opening area with respect to the valve plate is larger at two end portions close to the second oil grooves than at a central portion separated from the second oil grooves in a circumferential direction of relative rotation.

11. The cylinder block according to claim 10, wherein the plurality of pad oil grooves has a same extension length from the first oil groove and a same opening width with respect to the end face of the valve plate, and is provided at unequal pitches such that a mutual interval gradually increases from the end portions on both sides toward the central portion in the pad region.

12. The cylinder block according to claim 10, wherein outer peripheral side ends of the plurality of pad oil grooves are closed.

13. The cylinder block according to claim 10, wherein the plurality of pad oil grooves is provided so as to be symmetric with each other with respect to a virtual plane that divides the pad region into two equal parts in a circumferential direction of relative rotation.

14. The cylinder block according to claim 10, wherein each of the plurality of pad oil grooves extends linearly and is inclined with respect to a radial direction about the rotation axis.

15. The cylinder block according to claim 14, wherein the plurality of pad oil grooves provided in one half region portion with respect to a virtual plane that divides the pad region into two equal parts in the circumferential direction of relative rotation is inclined in a same direction with respect to a radial direction about the rotation axis.

16. The cylinder block according to claim 13 or 12, wherein the plurality of pad oil grooves provided in one half region portion and the plurality of pad oil grooves provided in another half region portion with respect to the virtual plane are inclined in directions opposite to each other.

17. The cylinder block according to claim 15, wherein the plurality of pad oil grooves provided in one half region portion and the plurality of pad oil grooves provided in another half region portion with respect to the virtual plane are inclined in a same direction.

18. A hydraulic motor comprising the cylinder block according to claim 10.

* * * * *